US012581356B2

(12) United States Patent
Kneckt et al.

(10) Patent No.: US 12,581,356 B2
(45) Date of Patent: Mar. 17, 2026

(54) MULTI-LINK DEVICE LOAD SIGNALING AND USE IN WLAN

(71) Applicant: Apple Inc., Cupertino, CA (US)

(72) Inventors: Jarkko L. Kneckt, Los Gatos, CA (US); Yong Liu, Campbell, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 442 days.

(21) Appl. No.: 18/165,099

(22) Filed: Feb. 6, 2023

(65) Prior Publication Data

US 2023/0254732 A1      Aug. 10, 2023

Related U.S. Application Data

(60) Provisional application No. 63/308,416, filed on Feb. 9, 2022.

(51) Int. Cl.
    *H04W 28/02*        (2009.01)
    *H04W 28/082*       (2023.01)
(52) U.S. Cl.
    CPC ................... *H04W 28/0284* (2013.01); *H04W 28/0263* (2013.01); *H04W 28/0289* (2013.01); *H04W 28/082* (2023.05)
(58) Field of Classification Search
    CPC ......... H04W 28/0284; H04W 28/0263; H04W 28/0289; H04W 28/082; H04W 28/0861; H04W 24/02; H04W 76/15; H04W 84/12; H04W 48/08; H04W 48/16; H04L 43/0876; H04L 43/0882; H04L 43/12
See application file for complete search history.

(56) References Cited

U.S. PATENT DOCUMENTS

| | | | | |
|---|---|---|---|---|
| 9,066,283 B2 * | 6/2015 | Seok | ...................... | H04W 48/20 |
| 2018/0302922 A1 * | 10/2018 | Patil | ................... | H04W 74/0833 |
| 2022/0322145 A1 * | 10/2022 | Monajemi | ............. | H04W 28/10 |
| 2022/0346165 A1 * | 10/2022 | Hsu | ......................... | H04W 76/15 |
| 2023/0189071 A1 * | 6/2023 | Kim | ....................... | H04W 28/16 |
| | | | | 370/235 |

* cited by examiner

*Primary Examiner* — Mohamed A Kamara
(74) *Attorney, Agent, or Firm* — Kowert, Hood, Munyon, Rankin & Goetzel, P.C.

(57) ABSTRACT

This disclosure relates to methods for multi-link device load signaling and use in scanning and congestion control in a wireless local area network (WLAN). A wireless device may be configured to operate as a multi-link device access point to provide multiple basic service sets. The wireless device may provide multi-link device load information associated with one or more basic service sets provided by the multi-link device access point. The multi-link device load information may include at least an indication of a number of multi-link capable wireless devices associated with the basic service set(s) provided by the multi-link device access point.

20 Claims, 21 Drawing Sheets

*Provide multi-link wireless local area network*
452

*Provide multi-link device load information for the wireless local area network*
454

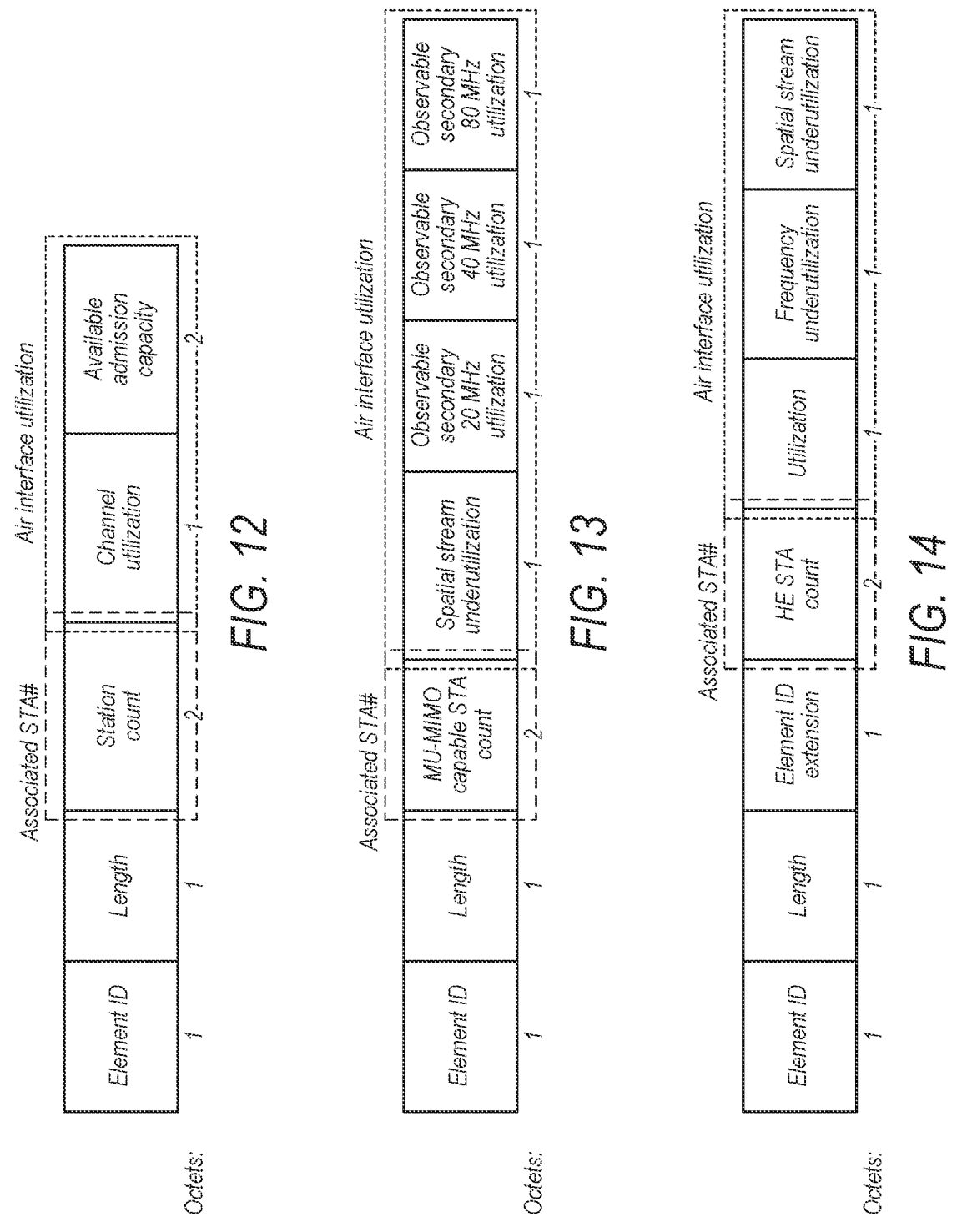

FIG. 18

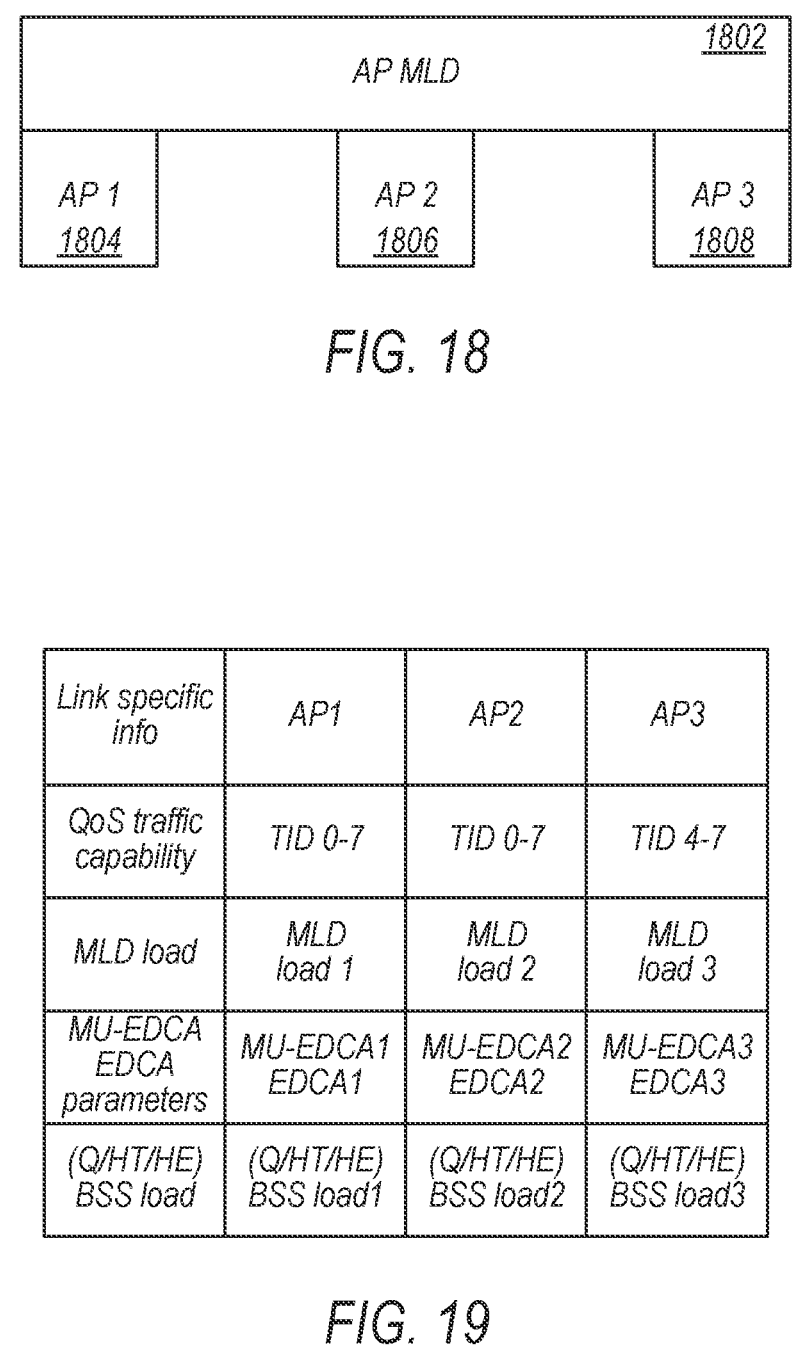

| Link specific info | AP1 | AP2 | AP3 |
|---|---|---|---|
| QoS traffic capability | TID 0-7 | TID 0-7 | TID 4-7 |
| MLD load | MLD load 1 | MLD load 2 | MLD load 3 |
| MU-EDCA EDCA parameters | MU-EDCA1 EDCA1 | MU-EDCA2 EDCA2 | MU-EDCA3 EDCA3 |
| (Q/HT/HE) BSS load | (Q/HT/HE) BSS load1 | (Q/HT/HE) BSS load2 | (Q/HT/HE) BSS load3 |

FIG. 19

| AP MLD | | |
|---|---|---|

| AP 1 2.4 GHz | | AP 2 5 GHz | | AP 3 6 GHz |
|---|---|---|---|---|

| Link 1, keep in power save | | Link 2, activate for TX/RX | | Link 3, activate for TX/RX |
|---|---|---|---|---|

| STA 1 2.4 GHz | STR | STA 2 5 GHz | eMSLR | STA 3 6 GHz |
|---|---|---|---|---|

| STA MLD | | | | |
|---|---|---|---|---|

*FIG. 20*

| Estimated affiliated AP operating band | AP capabilities based estimated performance level | Estimated congestion level | Suitable for use? |
|---|---|---|---|
| AP at 2.4 GHz | Performance level 1 | Congestion level 1 | No, no resources |
| AP at 5 GHz | Performance level 2 | Congestion level 2 | Yes, resources available |
| AP at 6 GHz | Performance level 3 | Congestion level 3 | Yes, resources available |

*FIG. 21*

| Estimated affiliated AP operating band | AP capabilities based estimated performance level | Estimated congestion level | Suitable for use? |
|---|---|---|---|
| AP at 2.4 GHz | Performance level 1 | Congestion level 1 | Yes, lot of resources available |
| AP at 5 GHz | Performance level 2 | Congestion level 2 | Yes, some resources available |
| AP at 6 GHz | Performance level 3 | Congestion level 3 | No, no resources |

2402
AP MLD

2404
STA MLD

Beacon (MLD load)    2406

| Transmit BSS | Multiple BSSID element | |
| --- | --- | --- |
| | Non-transmittal BSS1 | Non-transmittal BSS2 |

MLD load or (Q/HT/HE)
BSS load elements for all
BSSs included in the
multiple BSSID beacon

| Band | 2.4 GHz | 5 GHz | 6 GHz |
|---|---|---|---|
| Number of 20 MHz channels | 3 | 25 | 59 |

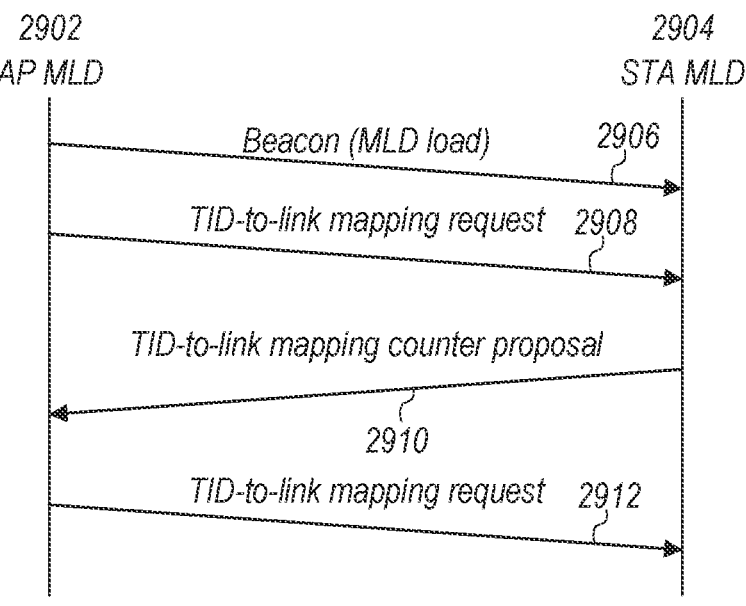

FIG. 29

| Operation | Allowed, if the MLD load level is higher: |
|---|---|
| Request voluntary TID-to-sublink mapping | Load level 1: at any load level, not limited |
| Prioritized request for semi-mapped link | Load level threshold 2 |
| Prioritized TID-to-sublink request | Load level threshold 3 |
| TID-to-link mapping according to MLD counter proposal | Load level threshold 4 |
| TID-to-sublink mapping against MLD counter proposal | Load level threshold 5 |

FIG. 30

| Forced TID-to-link mapping | Allowed, if the MLD load level is higher than: |
|---|---|
| Only high TIDs in 5 GHz | Load level threshold 1 |
| Only high TIDs in 6 GHz | Load level threshold 2 |
| Disable link at 2.4 GHz | Load level threshold 3 |
| Disable link at 5 GHz | Load level threshold 4 |
| Disable link at 6 GHz | Load level threshold 5 |
| Disable links at 2.4 and 5 GHz | Load level threshold 6 |
| Disable links at 2.4 and 6 GHz | Load level threshold 7 |
| Disable links at 5 and 6 GHz | Load level threshold 8 |

*FIG. 31*

| Link disablement threshold for different multi-link modes | Allowed, if the MLD load level is higher than: |
|---|---|
| NSTR link | Load level threshold 1 |
| STR link | Load level threshold 2 |
| eMLSR link | Load level threshold 3 |
| EDCA only STA | Load level threshold 4 |

*FIG. 32*

| MLD load parameters | Requirement |
|---|---|
| Number of associated MLDs in AP MLD | >50 |
| Number of MLDs using the affiliated AP | >30 |
| Total number affiliated APs in AP MLD | 3 |
| Number of active EDCA only STA in link | >10 |

*FIG. 33*

| Reason code | Case description |
|---|---|
| 0 | Success |
| 1 | Not specified reason for load balancing |
| 2 | No air interface resources available |
| 3 | Too many associated STAs |
| 4 | Too many associated MLDs |
| 5 | Too many links in the affiliated AP |
| 6 | Different loads on the links |
| 7 | The link is reserved for high TID traffic only |
| 8 | All affiliated APs are congested. No resources available |
| 9 | AP power save |

| Reason code | Case description |
|---|---|
| 0 | Accepted, mapping success |
| 1 | Rejected due to P2P transmissions on the current links |
| 2 | Device internal co-existence is very bad on STA links |
| 3 | External co-existence is very bad on STA links |
| 4 | Co-existence on the old link |
| 5 | Co-existence on the new link |
| 6 | STA power consumption is high, if it operates the proposed links |
| 7 | STA power consumption is high, if it operates the current links |
| 8 | QoS of current links is not suitable for traffic |
| 9 | The proposed links are too busy for QoS of traffic |
| 10 | No link disabling, because the AP MLD is not congested |
| 11 | No link disabling, because the current links are not congested |
| 12 | No link disabling, because the proposed links capacity is not suitable |

FIG. 36

MULTI-LINK DEVICE LOAD SIGNALING AND USE IN WLAN

PRIORITY INFORMATION

This application claims priority to U.S. provisional patent application Ser. No. 63/308,416, entitled "Multi-Link Device Load Signaling and Use in WLAN," filed Feb. 9, 2022, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including techniques and devices for multi-link device load signaling and use in a multi-link wireless local area network architecture.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices, or user equipment devices (UEs) may take the form of smart phones or tablets that a user typically carries. Additionally, UEs may be configured to simultaneously communicate over multiple wireless links over a wireless local area network (WLAN). Such use of multiple links in a WLAN setting can complicate load estimation, reporting, and use. Accordingly, improvements in the field are desired.

SUMMARY

Embodiments are presented herein of, inter alia, systems, apparatuses, and methods for devices for multi-link device load signaling and use in a multi-link wireless local area network (WLAN) environment.

A wireless device may include one or more antennas, one or more radios operably coupled to the one or more antennas, and a processor operably coupled to the one or more radios. The wireless device may be configured to establish a connection with an access point through a wireless local area network (WLAN) over multiple wireless links, or may be an access point configured to establish a connection with one or more other wireless devices through a WLAN over multiple wireless links. The wireless device may operate in each of the multiple wireless links using a respective radio of the one or more radios.

According to the techniques described herein, the wireless device may provide or receive multi-link device load information for a WLAN. The multi-link device load information may include any of a variety of types of information relating to the presence, impact, and usage of multi-link devices in the WLAN. Such information could relate to the number of multi-link devices associated with a given basic service set, numbers of multi-link devices associated with other basic service sets provided by the same multi-link access point entity, or by the same physical access point device in the same band or in general. Such information could additionally or alternatively include information relating to how many links are set up for wireless devices in the WLAN, how many links are disabled and/or how many multi-link devices have setup but disabled links, multi-link operating modes in use, and/or any of various other types of information.

Such information may be used by the access point providing the WLAN to determine when to implement congestion control mechanisms, and/or by non-access point stations for selecting one or more links to setup (e.g., for better performance). Another possible use by non-access point stations could include determining whether congestion control mechanisms in use are justified and correspondingly whether to abide by them. Other possible uses are also envisioned.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, unmanned aerial vehicles, unmanned aerial controllers, automobiles and/or motorized vehicles, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 12-14 illustrate example details of possible formats for a BSS load element, an extended BSS load element, and a HE BSS load element, respectively, according to some embodiments;

FIG. 18 illustrates an example AP MLD architecture in which an AP MLD 1802 includes three affiliated APs, according to some embodiments;

FIG. 19 is a table illustrating an example of sets of link specific parameters that could be used in conjunction with the AP MLD architecture of FIG. 18, according to some embodiments;

FIG. 20 illustrates aspects of an example system in which an AP MLD and a STA MLD have three links between them, according to some embodiments;

FIG. 21 is a table illustrating an example of possible performance assessments by the STA MLD for the three links of FIG. 20 based on the link specific load information for each of the links, according to some embodiments;

FIG. 29 is a signal flow diagram illustrating example aspects of a scenario in which an AP MLD performs TID-to-link mapping for a STA MLD, according to some embodiments;

FIG. 30 is a table illustrating examples of possible BSS load threshold levels at which an AP MLD may be allowed to perform the corresponding congestion control signaling, according to some embodiments;

FIG. 31 is a table illustrating various example load level thresholds that could be defined for limiting TIDs/disabling links for links in various frequency bands and frequency band combinations, according to some embodiments;

FIG. 32 is a table illustrating various example load level thresholds that could be defined for disabling links for different multi-link modes, according to some embodiments;

FIG. 33 is a table illustrating a specific example set of requirements for allowing an AP MLD to be allowed to disable a link from a STA MLD, which could be configured for an enterprise class network, according to some embodiments;

FIG. 34 is an example signal flow diagram in which an AP MLD and a STA MLD can negotiate TID-to-link mapping using reason codes, according to some embodiments; and FIGS. 35-36 are tables illustrating a variety of example AP and STA reason code values and meanings that could be defined for use in conjunction with the system of FIG. 34, according to some embodiments.

Figure 1:
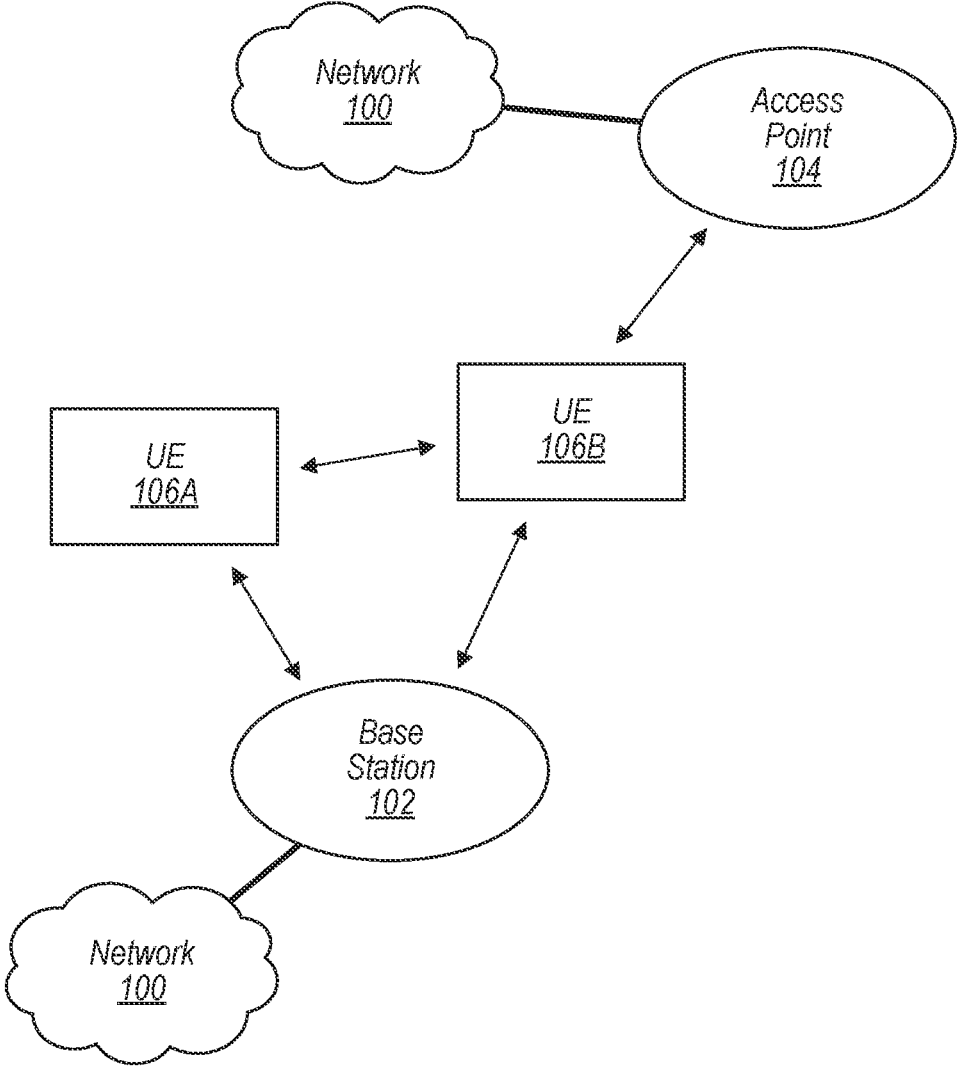
FIG. 1 illustrates an example wireless communication system including a user equipment device (UE), according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device or Station (STA)—any of various types of computer systems or devices that perform wireless communications. A wireless device can be portable (or mobile) or may be stationary or fixed at a certain location. The terms "station" and "STA" are used similarly. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station or Access Point (AP)—The term "Base Station" (also called "eNB") has the full breadth of its ordinary meaning, and at least includes a wireless communication station installed at a fixed location and used to communicate as part of a wireless communication system. The term "access point" is used similarly.

Processing Element (or Processor)—refers to various elements or combinations of elements that are capable of performing a function in a device, e.g., in a user equipment device or in a network infrastructure device. Processors may include, for example: processors and associated memory, circuits such as an ASIC (Application Specific Integrated Circuit), portions or circuits of individual processor cores, entire processor cores, processor arrays, programmable hardware devices such as a field programmable gate array (FPGA), and/or larger portions of systems that include multiple processors, as well any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

IEEE 802.11—refers to technology based on IEEE 802.11 wireless standards such as 802.11a, 802.11.b, 802.11g, 802.11n, 802.11-2012, 802.11ac, 802.11ad, 802.11ax, 802.11ay, 802.11be, and/or other IEEE 802.11 standards. IEEE 802.11 technology may also be referred to as "Wi-Fi" or "wireless local area network (WLAN)" technology.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
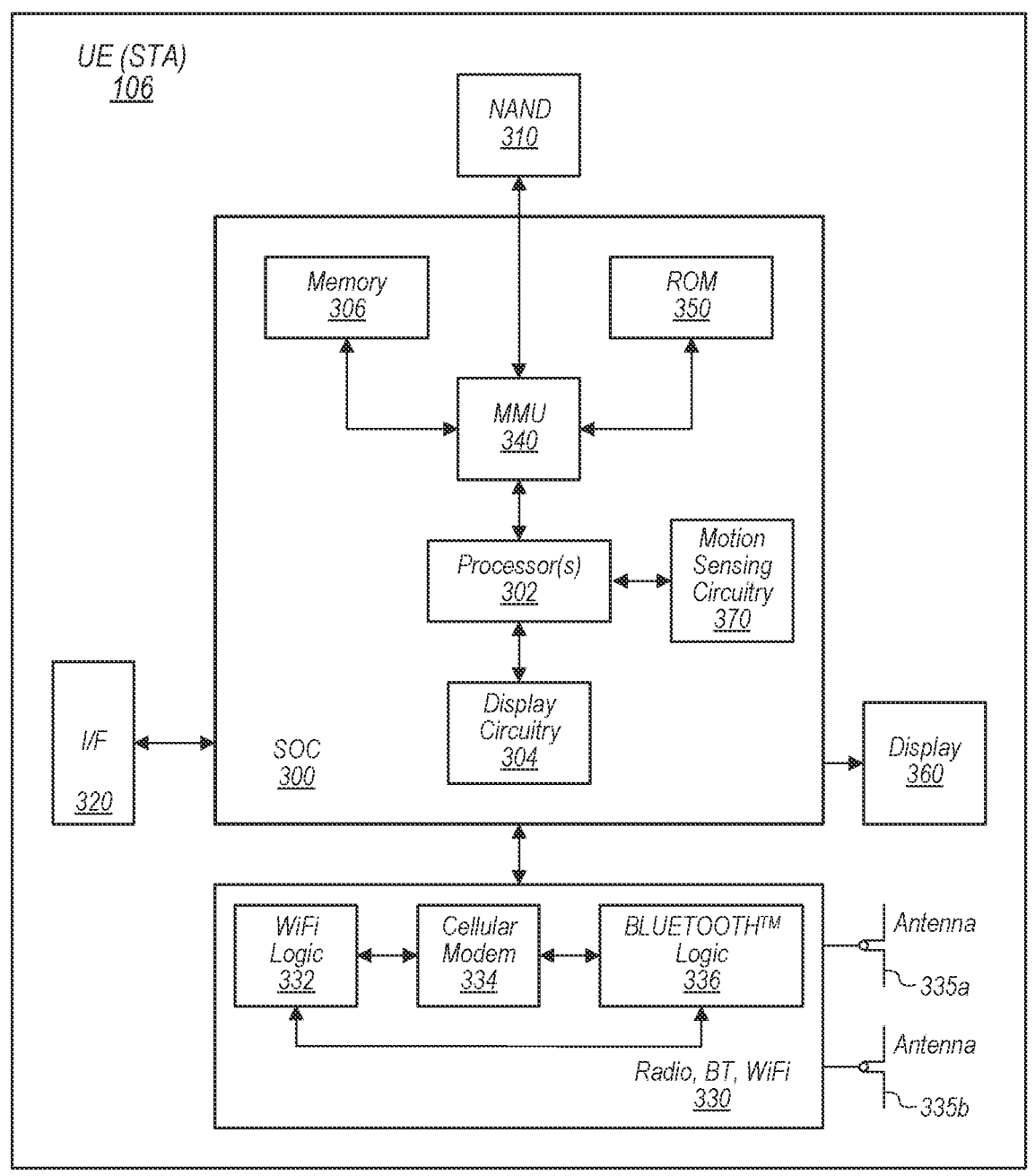
FIG. 2 is a block diagram illustrating an example UE, according to some embodiments.

FIGS. 1-2—Wireless Communication System

FIG. 1 illustrates an example of a wireless communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc. Wireless devices 106A and 106B may be user devices, which may be referred to herein as "user equipment" (UE), UEs, or UE devices.

The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The base station 102 may be a base transceiver station (BTS) or cell site, and may include hardware that enables wireless communication with the UE devices 106A and 106B. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and/or between the UE devices 106 and the network 100. In other implementations, base station 102 can be configured to provide communications over one or more other wireless technologies, such as an access point supporting one or more WLAN protocols, such as 802.11 a, b, g, n, ac, ad, ay, be and/or ax, or LTE in an unlicensed band (LAA).

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (associated with, for example, WCDMA or TDS-CDMA air interfaces), LTE, LTE-Advanced (LTE-A), 5G NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and similar devices over a geographic area via one or more cellular communication technologies.

Note that at least in some instances a UE device 106 may be capable of communicating using any of multiple wireless communication technologies. For example, a UE device 106 might be configured to communicate using one or more of GSM, UMTS, CDMA2000, LTE, LTE-A, 5G NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106 may be configured to communicate using only a single wireless communication technology.

As shown, the exemplary wireless communication system also includes a WLAN access point (AP) 104, which communicates over a transmission medium with the wireless device 106B. The WLAN access point, which may be a Wi-Fi AP, also provides communicative connectivity to the network 100. Thus, according to some embodiments, wireless devices may be able to connect to either or both of the base station 102 (or another cellular base station) and the access point 104 (or another access point) to access the network 100 at a given time.

The UEs 106A and 106B may include handheld devices such as smart phones or tablets, wearable devices such as smart watches or smart glasses, and/or may include any of various types of devices with cellular communications capability. For example, one or more of the UEs 106A and 106B may be a wireless device intended for stationary or nomadic deployment such as an appliance, measurement device, control device, etc.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102.

The UE 106 may include one or more devices or integrated circuits for facilitating wireless communication, potentially including a cellular modem and/or one or more other wireless modems. The wireless modem(s) may include one or more processors (processor elements) and various hardware components as described herein. The UE 106 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The wireless modem(s) described herein may be used in a UE device as defined herein, a wireless device as defined herein, or a communication device as defined herein. The wireless modem described herein may also be used in a base station or other similar network side device.

The UE 106 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios, each of which may be configured to communicate via a respective wireless link. Other configurations are also possible.

FIG. 2—Example Block Diagram of a UE Device

FIG. 2 illustrates one possible block diagram of an UE device, such as UE device 106. In some instances (e.g., in an 802.11 communication context), the UE 106 may alternatively be referred to as a station (STA) 106, and possibly more particularly as a non-AP STA 106. As shown, the UE device 106 may include a system on chip (SOC) 300, which may include portions for various purposes. Some or all of the various illustrated components (and/or other device components not illustrated, e.g., in variations and alternative arrangements) may be "communicatively coupled" or "operatively coupled," which terms may be taken herein to mean components that can communicate, directly or indirectly, when the device is in operation.

As shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MNU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and in some embodiments multiple antennas 335a and 335b, for performing wireless communication with base stations and/or other devices. For example, the UE device 106 may use antennas 335a and 335b to perform the wireless communication. As noted above, the UE device 106 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106 to perform Wi-Fi or other WLAN communications on an 802.11 network. The Bluetooth Logic 336 is for enabling the UE device 106 to perform Bluetooth communications. The cellular modem 334 may be a cellular modem capable of performing cellular communication according to one or more cellular communication technologies.

As described herein, UE 106 may include hardware and software components for implementing embodiments of this disclosure. For example, one or more components of the wireless communication circuitry 330 (e.g., Wi-Fi logic 332, cellular modem 334, BT logic 336) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 3:
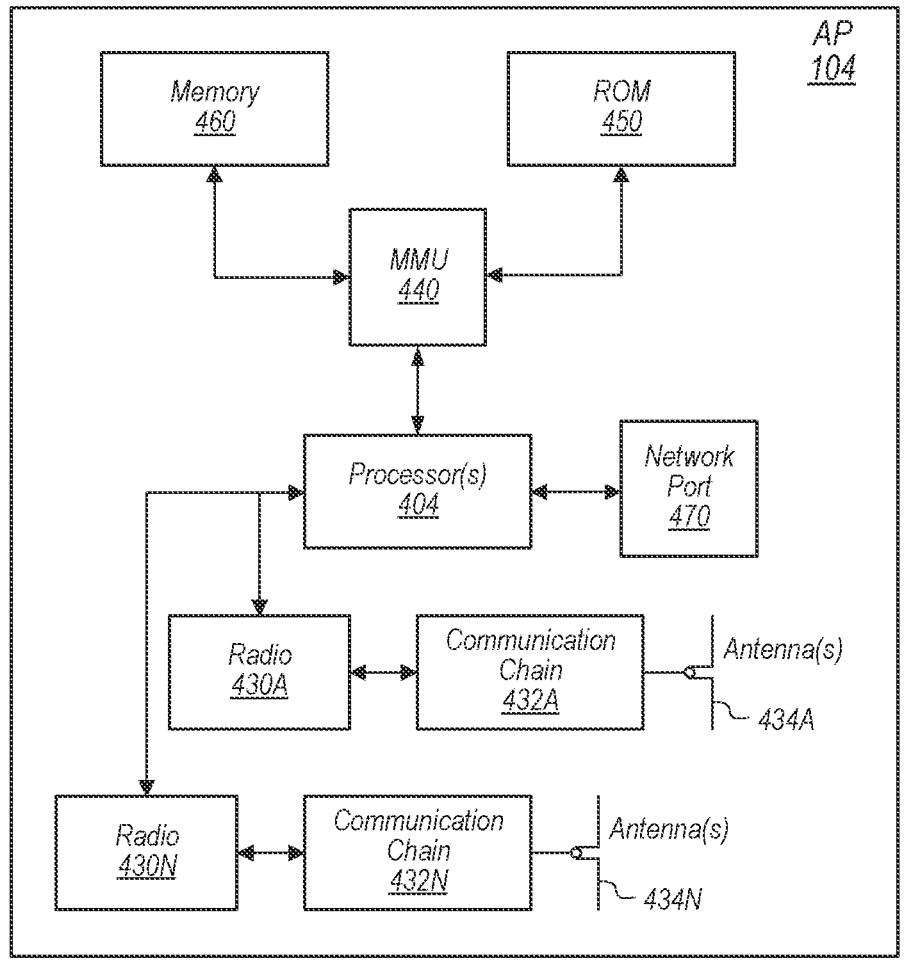
FIG. 3 is a block diagram illustrating an example network element or access point, according to some embodiments.

FIG. 3—Block Diagram of an Access Point

FIG. 3 illustrates an example block diagram of an access point (AP) 104, according to some embodiments. In some instances (e.g., in an 802.11 communication context), the AP 104 may also be referred to as a station (STA), and possibly more particularly as an AP STA. It is noted that the AP of FIG. 3 is merely one example of a possible access point. As shown, AP 104 may include processor(s) 404 which may execute program instructions for the AP 104. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The AP 104 may include at least one network port 470. The network port 470 may be configured to couple to a telephone network and provide a plurality of devices, such as UE devices 106, access to the telephone network as described above in FIG. 1.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The AP 104 may include one or more radios 430A-430N, each of which may be coupled to a respective communication chain and at least one antenna 434, and possibly multiple antennas. The antenna(s) 434 may be configured to operate as a wireless transceiver and may be further configured to communicate with UE devices 106/107 via radio 430. The antenna(s) 434A-N communicate with their respective radios 430A-N via communication chains 432A-N. Communication chains 432 may be receive chains, transmit chains, or both. The radios 430A-N may be configured to communicate via various wireless communication standards, including, but not limited to, LTE, LTE-A, NR, GSM, UMTS, CDMA2000, Wi-Fi, etc. The UE 104 may be configured to operate in multiple wireless links using the one or more radios 430A-N, wherein each radio is used to operate in a respective wireless link.

The AP 104 may be configured to communicate wirelessly using multiple wireless communication standards. In some instances, the AP 104 may include multiple radios, which may enable the network entity to communicate according to multiple wireless communication technologies. For example, as one possibility, the AP 104 may include an LTE or 5G NR radio for performing communication according to LTE as well as a Wi-Fi radio for performing communication according to Wi-Fi. In such a case, the AP 104 may be capable of operating as both an LTE base station and a Wi-Fi access point. As another possibility, the AP 104 may include a multi-mode radio which is capable of performing communications according to any of multiple wireless communication technologies (e.g., NR and Wi-Fi, NR and UMTS, LTE and CDMA2000, UMTS and GSM, etc.). As still another possibility, the AP 104 may be configured to act exclusively as a Wi-Fi access point, e.g., without cellular communication capability.

As described further subsequently herein, the AP 104 may include hardware and software components for implementing or supporting implementation of features described herein. The processor 404 of the access point 104 may be configured to implement or support implementation of part or all of the methods described herein, e.g., by executing program instructions stored on a memory medium (e.g., a non-transitory computer-readable memory medium) to operate multiple wireless links using multiple respective radios. Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the AP 104, in conjunction with one or more of the other components 430, 432, 434, 440, 450, 460, 470 may be configured to implement or support implementation of part or all of the features described herein.

Multi-Link Communications Over WLAN

Wireless local area networks (WLANs) may utilize multiple links during communications between a wireless station (STA), such as a UE 106 as illustrated in FIG. 2, and a wireless access point (AP) such as the AP 104 illustrated in FIG. 3, in either or both of uplink and downlink communications. The STA may be any of a variety of types of wireless stations, including but not limited to a UE 106, a smart phone, tablet, personal computer, smart watch, accessory device, an unmanned aerial vehicle (UAV), an unmanned aerial controller (UAC), an automobile, or any other type of wireless device capable of communicating over a WLAN.

While the 802.11ax standard allows a STA and an AP to communicate according to either a 5 GHz link or a 2.4 GHz link, for example, 802.11be may allow a STA and an AP to communicate over multiple links simultaneously, potentially including 2.4 GHz, 5 GHz, and/or 6 GHz links, which may improve throughput and reduce communication latency, at least in some instances. For example, a single connection between a STA and an AP may utilize multiple wireless links, each of which operates within the same or a different frequency band. Embodiments herein propose load information signaling and use enhancements for AP and non-AP STAs that can operate in multiple links.

Operating in multiple links may shorten transmission delays, as the associated AP and the STA simultaneously communicate on multiple links and transmissions may be performed over the first available link (e.g., rather than having to wait for a particular link to become available, which may be temporarily congested or otherwise unavailable). Accordingly, a single congested link may be prevented from severely increasing transmission delays, and the duration of transmission delays may be shortened. Additionally, multiple link operation introduces power consumption considerations, as STA power consumption may vary depending on the number of spatial streams and the size of the operating bandwidth. Depending on the STA configuration, operation over multiple links may consume more power than operation over a single link.

To manage and operate in a scenario in which such multiple link operation is possible, it may be useful to provide accurate and detailed load information. Embodiments described herein include devices and mechanisms to address these and other concerns.

FIG. 4—Flowchart

Figure 4:
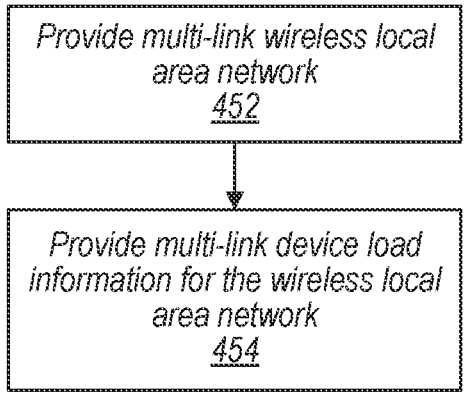
FIG. 4 is a flowchart diagram illustrating an example method for multi-link device load signaling and use in a wireless local area network, according to some embodiments.

FIG. 4 is a flowchart diagram illustrating a method for communication between a wireless station (STA) such as a UE 106 and a wireless access point (AP) such as the AP 104 over a WLAN using multiple wireless links, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 4 may be implemented by a wireless device, such as the AP 104 or UE 106 illustrated in and described with respect to FIGS. 1-3, or more generally in conjunction with any of the computer circuitry, systems, devices, elements, or components shown in the Figures, among others, as desired. For example, a processor (and/or other hardware) of such a device may be configured to cause the device to perform any combination of the illustrated method elements and/or other method elements.

Note that while at least some elements of the method of FIG. 4 are described in a manner relating to the use of communication techniques and/or features associated with IEEE 802.11 specification documents, such description is not intended to be limiting to the disclosure, and aspects of the method of FIG. 4 may be used in any suitable wireless communication system, as desired. As shown, the method may operate as follows.

A first wireless device (e.g., an AP STA) may provide a multi-link wireless local area network (WLAN) (452) information. The multiple wireless links information may include information for IEEE 802.11 based wireless links, at least according to some embodiments. The wireless links may include links in one or more separate frequency bands (e.g., a 2.4 GHz link, a 5 GHz link, a 6 GHz link, and/or other wireless links).

The first wireless device may provide multi-link device load information for the WLAN (454). The multi-link device load information may be provided at any or all of various possible reporting levels. For example, the multi-link device load information could be provided for a specific basic service set (BSS) provided by the first wireless device. As another possibility, the multi-link device load information could be provided for all BSSs provided by the first wireless device in a given frequency range. As a further possibility, the multi-link device load information could be provided for all BSSs provided by a given access point entity of the first wireless device. As a still further possibility, the multi-link device load information could be provided for all BSSs provided by all access point entities of the first wireless device in all frequency ranges in which the first wireless device operates. At least in some instances, the multi-link device load information may include an indication of the reporting level(s) for the multi-link device load information, and/or an indication of the reporting level(s) for the multi-link device load information may be provided separately from the multi-link device load information.

The multi-link device load information may be provided in any of various possible ways. In some embodiments, the multi-link device load information may be provided in a beacon transmission for a basic service set (and possible for multiple basic service sets) provided by the first wireless device. In some instances, the multi-link device load information may be provided in a multiple basic service set identifier (MBSSID) beacon. Such a beacon may include BSS system information for multiple BSSs, for example including the BSS on which the beacon is transmitted, as well as one or more other BSSs provided by the first wireless device. The MBSSID beacon may include BSS specific load information (e.g., potentially including multi-link device load information) for each of the BSSs affiliated with the MBSSID, and/or may include multi-link device load information at a broader reporting level, such as for a set of BSSs operating in the same frequency range and provided by the first wireless device.

As another possibility, the multi-link device load information may be provided in a probe response, e.g., when responding to a probe request received from another wireless device. In such a scenario, it may be possible for the probe request to including information indicating one or more requested reporting levels for the multi-link device load information, in which case the probe response may include multi-link device loading information at the requested reporting level(s). Note that other options for providing the multi-link device load information (e.g., in addition or alternatively to providing such information in a beacon frame or a probe response) are also possible.

The multi-link device load information may include any of a variety of types of information. In some embodiments, the multi-link device load information may include an indication of a number of multi-link capable wireless devices associated with the WLAN at the selected reporting level(s). The multi-link device load information may additionally or alternatively include an indication of a number of non-multi-link capable wireless devices associated with the WLAN at the selected reporting level(s). Another possibility could include multi-link capability information and/or multi-link operating mode information (e.g., indicating how many STR/NSTR/eMLSR links or link pairs operating on enabled links, and/or how many EDCA only links are enabled) for one or more wireless devices associated with the WLAN at the selected reporting level(s). Such information may be useful for a second wireless device (e.g., a non-AP STA) considering associating with a basic service set provided by the first wireless device, for example to facilitate determining the impact of loading on the first wireless device (potentially including loading of other basic service sets provided by the first wireless device) on operation as part of the basic service set, at least according to some embodiments.

Indicators of congestion levels could be included in the multi-link load information, at least in some embodiments, such as the number of wireless links setup for wireless devices associated with the WLAN at the selected reporting level(s), the number of wireless links disabled and/or the number of wireless devices with at least one link disabled at the selected reporting level(s), and/or the number of links with limitations on mapped traffic identifiers, among various possibilities. Such information may also be useful for a wireless device considering associating with a basic service set provided by the first wireless device, for example to facilitate determining the extent of current congestion control measures being enforced by the first wireless device (potentially including measures taken on other basic service sets provided by the first wireless device), at least according to some embodiments.

In some instances, a wireless device receiving the multi-link device load information from the first wireless device may select a BSS with which to associate based at least in part on the multi-link device load information received from the first wireless device. For example, such a wireless device may determine how various available BSSs on various links are expected to perform for the needs (e.g., throughput, QoS, etc.) of the wireless device based on the multi-link device load information and possibly other load information available for those BSSs, select a BSS with which to associate that is determined as being expected to perform best for the wireless device, and establish an association with the selected BSS.

In some embodiments, the first wireless device may determine to enable and/or disable one or more congestion control mechanisms based at least in part on the multi-link device load information. Such congestion control mechanisms may be enabled/disabled in accordance with a congestion control mechanism enablement configuration defined by the first wireless device. For example, such a configuration could define which congestion control mechanisms are allowed at which load level thresholds in a BSS provided by the first wireless device. The first wireless device may provide a signaling indication of the selected congestion control mechanism enablement configuration for the BSS. Thus, it could be the case that the first wireless device determines whether load level in the BSS meets the load level threshold at which a given congestion control mechanism is allowed in the BSS before determining whether to enable the congestion control mechanism for an associated wireless device or disable a previously enabled congestion control mechanism for an associated wireless device.

In some embodiments, wireless devices associated with a BSS provided by the first wireless device and/or wireless devices that may prospectively associated with a BSS provided by the first wireless device may use the multi-link device load information to determine whether to establish one or more links with the first wireless device, and/or may determine which links to establish with the first wireless device based at least in part on the multi-link device load information. In some embodiments, a wireless device associated with a BSS provided by the first wireless device may use the multi-link device load information to determine whether one or more congestion control mechanisms enabled by the first wireless device are valid, and correspondingly whether to apply those congestion control mechanisms. For example, such a wireless device could determine whether a requested congestion control mechanism is in accordance with the congestion control mechanism enablement configuration for the BSS, and determine that the requested congestion control mechanism need not be accepted if it is not in accordance with the congestion control mechanism enablement configuration (e.g., due to insufficient loading and/or congestion in the BSS).

In some embodiments, the congestion control mechanisms could include provision of a traffic identifier (TID)-to-link mapping request from the first wireless device to a wireless device associated with a BSS provided by the first wireless device. Such a TID-to-link mapping request (or other congestion control mechanism request) may include one or more reason codes that justify partial or full link disablement for one or more links for the wireless device. Such reason codes could be used to provide an indication of a lack of air interface resources available in the BSS, too many associated STAs in the BSS, too many associated MLD STAs in the BSS, too many links in the MLD AP providing the BSS, a load-balancing-based reason for enabling the congestion control mechanism, a link associated with the BSS being reserved for traffic with high traffic identifiers (TIDs), all APs operated by the wireless device being congested, and/or a MLD AP power consumption-based reason for enabling the congestion control mechanism. Other possibilities could include a reason code that can signal if an AP needs to perform radar detection and is not able to serve STAs during the time, if a STA or AP has co-existence issues (e.g., if the STA or AP has another radio that operates at the same time and causes interference to the reported radio). Still other reason code options are also possible.

A wireless device may respond to such a TID-to-link mapping request (or other congestion control mechanism request) by accepting it or by making a counter proposal to the first wireless device, at least according to some embodiments. In the counter proposal, the proposed link mapping may be justified with one or more reason codes. Such reason codes could be used to provide an indication of an internal interference or co-existence-based reason for the counter proposal, a wireless device power consumption-based reason for the counter proposal, a Quality of Service (QoS)-based reason for the counter proposal, and/or insufficient congestion having been observed by the wireless device to support the requested congestion control mechanism, among various possibilities.

Note that it may be the case that both an AP and a STA may provide one or more reason codes for the request and response (e.g., respectively). Based on the reason codes used by the negotiating devices, the first wireless device may decide whether to force the wireless device to operate in accordance with the proposed congestion control mechanism, to accept the counter proposal, to cancel the proposal, or to make yet another proposal to the wireless device, among various possible options.

As previously noted herein, in some embodiments, a wireless device receiving a TID-to-link mapping request may determine to not follow the TID-to-link Mapping request, for example if the reason code used by the first wireless device is different from (e.g., not supported by) the wireless device's assessment of the links proposed for TID-to-link mapping. For example, it may be possible that the first wireless device can define and signal one or more load and/or congestion level thresholds (e.g., based on any of various metrics, potentially including combinations of multiple metrics, which may include any of the various multi-link device load and/or congestion metrics described herein) at which one or more corresponding congestion control mechanisms are allowed for a given basic service set (or for multiple basic service sets) provided by the first wireless device, e.g., as the a congestion control mechanism enablement configuration. In such a scenario, if a wireless device receiving a TID-to-link mapping and/or link disablement request determines (e.g., based on the multi-link device load information provided by the first wireless device, and/or based on performing detection on the applicable wireless medium) that the threshold condition(s) for the requested TID-to-link mapping and/or link disablement is not met, the wireless device may reject the TID-to-link mapping and/or link disablement request, and may potentially include a reason code indicating insufficient congestion to enforce the TID-to-link mapping and/or link disablement request in the rejection response.

The counterproposal from the wireless device may contain device-specific reason codes that may be not visible for the first wireless device. For instance, a wireless device may report internal interference due to transmissions of one or more other radios in the same device, or that the radio that would be used in the proposed new link is already in use for other purposes or otherwise currently unavailable.

Such a wireless device may also or alternatively provide reason codes to signal that its operation in the proposed new TID-to-link mapping would increase its power consumption or likely violate the QoS of the traffic. These reason codes may be based on the wireless device's assessment of the links provided by the first wireless device and/or on the MLD load information provided by the first wireless device, among various possibilities.

Thus, according to the method of FIG. 4, it may be possible for wireless devices operating in a wireless local area network to effectively signal multi-link device load information, and to use such information for network selection, congestion control, congestion control oversight, and/or various other possible functions. Such techniques may improve any or all of throughput, reliability, and/or power consumption, among various possible benefits, at least according to some embodiments.

FIGS. 5-36 and Additional Information

FIGS. 5-36 illustrate and describe further aspects that might be used in conjunction with the method of FIG. 4 if desired. It should be noted, however, that the exemplary details illustrated in and described with respect to FIGS. 5-36 are not intended to be limiting to the disclosure as a whole: numerous variations and alternatives to the details provided herein below are possible and should be considered within the scope of the disclosure.

Various Wi-Fi based communication systems may include the use of a basic service set (BSS) load element. The BSS load element may be used to signal BSS congestion. Multiple BSS load elements may be defined. For example, IEEE 802.11e may define a BSS load element, IEEE 802.11 ac may define an extended BSS load element, and IEEE 802.11ax may define a high-efficiency (HE) BSS load element. These elements may typically be used to list the number of devices that support the associated enhancement (e.g., 802.11e, 802.11ac, and 802.11ax, respectively), and/or to list the air time utilization for the transmission enhancements defined in the associated amendment. For example, the BSS load element may list airtime utilization, the extended BSS load element may contain 20/40/80 MHz bandwidth utilizations, and the HE load element may contain spatial stream utilization statistics. The BSS load element may be used by a station (STA) to select a BSS for association. For example, the STA may estimate whether an access point (AP) has resources available for the STA based at least in part on the information provided in the BSS load element.

In Wi-Fi 7, it may be possible for a STA multi-link device (MLD) to associate with an AP MLD. In such a case, in association, the STA MLD may request setup of one or more links. The AP may accept the setup links in an association response. The STA MLD may then select the link in which it is awake and transmits data. Some links may have a link pair specific operation mode (e.g., STR or NSTR) or a link may be configured to operate in eMLSR mode, according to some embodiments. The AP MLD may also have tools to disable specific links. It may be the case that a STA MLD cannot (e.g., is not permitted to) transmit or receive frames on disabled links. Additionally, or alternatively, an AP may be able to limit the traffic identifiers (TIDs) that are allowed to be transmitted in each link. For instance, it may be possible that only high Quality of Service (QoS) (e.g., high TID) traffic is allowed to be transmitted on a given link, in some scenarios.

Figure 5:
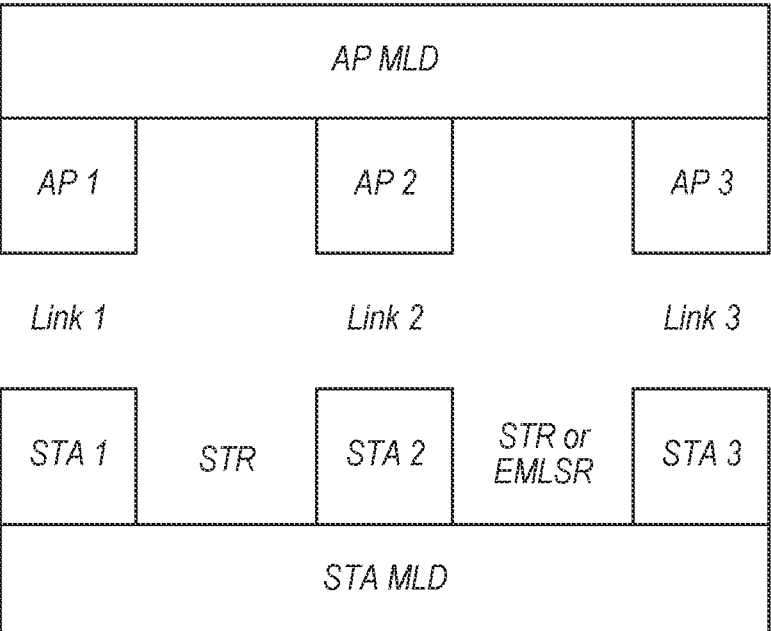
FIG. 5 illustrates aspects of an example of a possible set of links between an AP MLD and a STA MLD, according to some embodiments.

FIG. 5 illustrates aspects of an example of such a possible set of links between an AP MLD and a STA MLD, according to some embodiments. As shown, in the illustrated scenario, the AP MLD may include three AP devices and the STA MLD may include three STA devices, between which three links can be formed, each of which can have different operation modes.

Each AP in FIG. 5 may include a (Q/HT/HE) BSS load element in Beacon and Probe response and (re-)association response frames on its load level at the channel. A STA MLD may combine information from the various elements to determine the congestion level of each AP in the AP MLD and to select the AP(s) for data transmissions.

Figure 6:
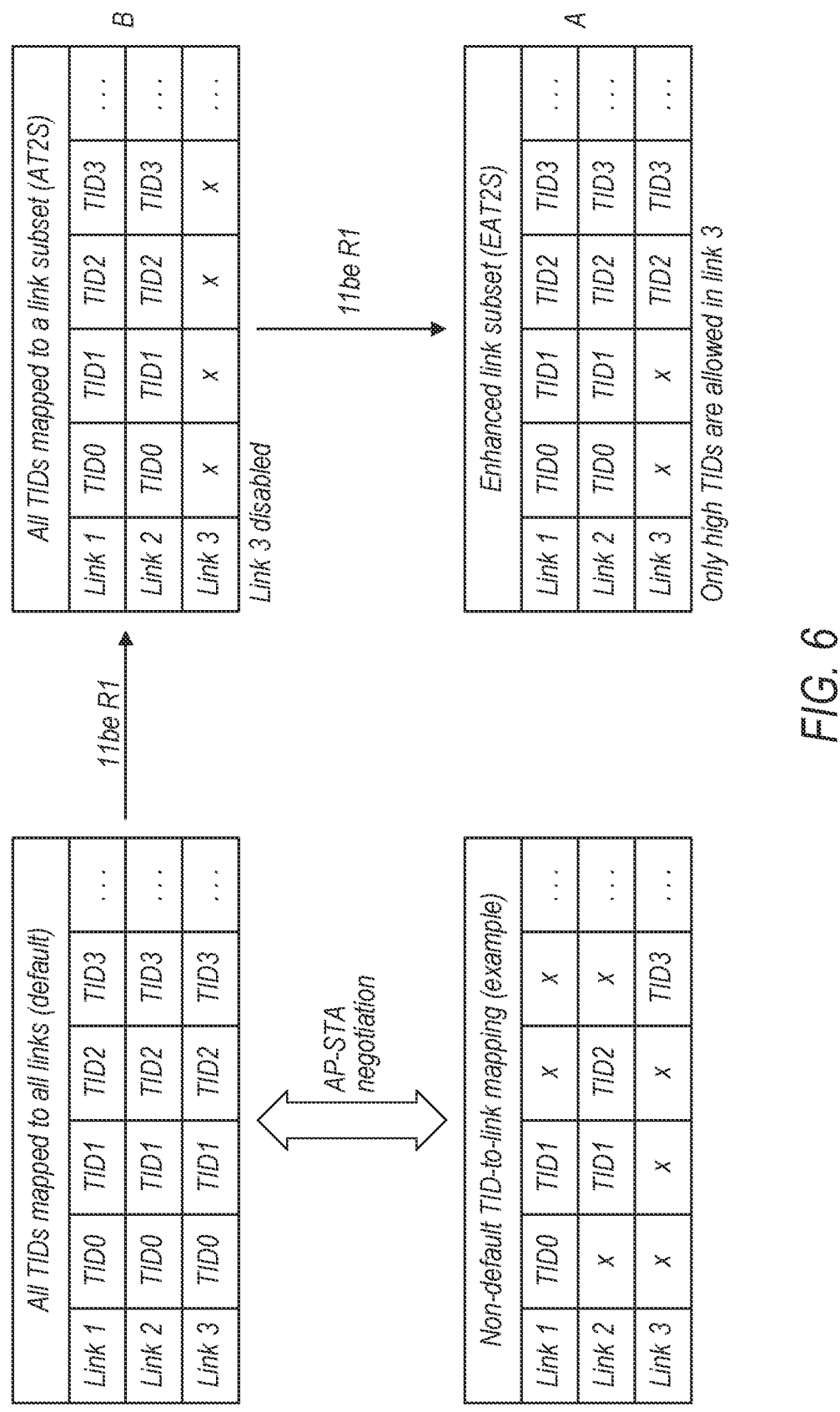
FIG. 6 illustrates aspects of various possible example TID-to-link-subset mapping arrangements that could be configured for a set of multiple links between an AP MLD and a STA MLD, according to some embodiments.

FIG. 6 illustrates aspects of various possible example TID-to-link-subset mapping arrangements that could be configured for a set of multiple links between an AP MLD and a STA MLD such as those illustrated and described with respect to FIG. 5. As shown in the upper left of FIG. 6, a default mapping may include all TIDs being mapped to all links. If desired, a non-default TID-to-link mapping can be configured via AP-STA negotiation, such as illustrated in the lower left of FIG. 6. As illustrated in the upper right of FIG. 6, it may also be possible for all TIDs to be mapped to a link subset (e.g., link 3 may be disabled, in the illustrated example). According to a further variation illustrated in the lower right of FIG. 6, it may also be possible for the AP MLD to configure the STA MLD to only permit a subset of TIDs on certain links (e.g., only high TIDs may be allowed in link 3, in the illustrated example).

Figure 7:
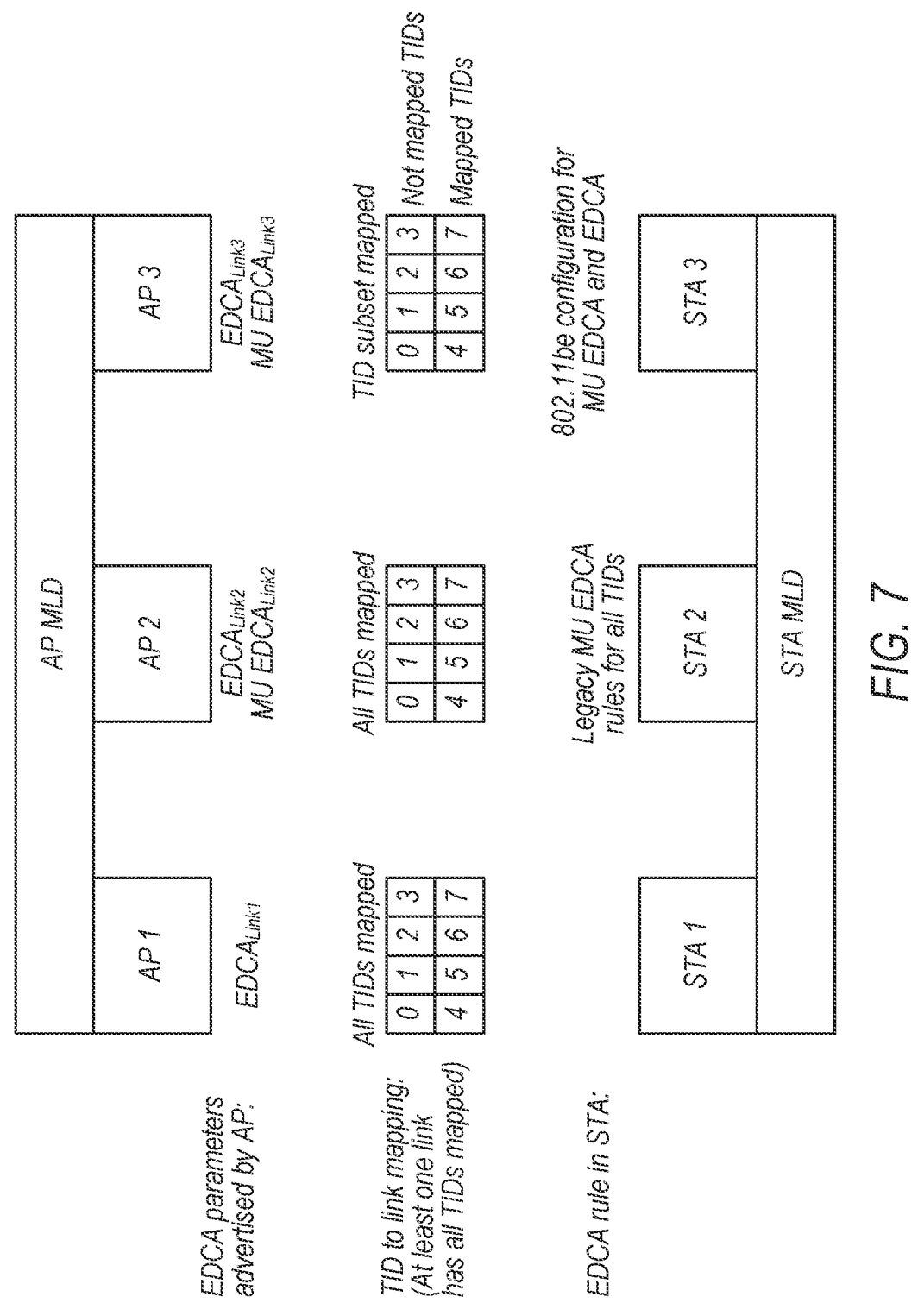
FIG. 7 illustrates example aspects of a possible enhanced TID-to-link-subset (ET2LS) mapping that could be used in a MLD wireless communication system, according to some embodiments.

FIG. 7 illustrates example aspects of possible enhanced TID-to-link-subset (ET2LS) mapping that could be used in a MLD wireless communication system, according to some embodiments. In the illustrated scenario, similar to the scenario of FIG. 5, an AP MLD and a STA MLD may establish three links. Enhanced distributed channel access (EDCA) parameters may be advertised by the AP for each link, including multi-user (MU) EDCA parameters for links 2 and 3. For TID to link mapping, in the illustrated scenario, all TIDs may be mapped to links 1 and 2, while a TID subset may be mapped (TIDs 0, 1, 2, and 3 not mapped, TIDs 4, 5, 6, and 7 mapped) to link 3. As shown, for link 2 legacy MU EDCA rules for all TIDs may be in place for link 2, while for link 3, an 802.11be based configuration for MU EDCA and EDCA may be in place. At least according to some embodiments, the ET2LS rules may include that at least one link has all TIDs mapped (other links can also have all TIDs mapped), and that at maximum one link may have TID subset mapping, where the mapped TIDs use legacy MU EDCA rules, and the not mapped TIDs use MU EDCA parameters.

In some embodiments, MU EDCA parameters may configure arbitration inter-frame spacing (AIFS), contention window minimum (CW$_{MIN}$), and contention window maximum (CW$_{MAX}$). It may be the case that a MU EDCA timer can only be used in legacy MU EDCA rules (this may allow the access category (AC) to return to EDCA parameters).

Figures 8, 9:
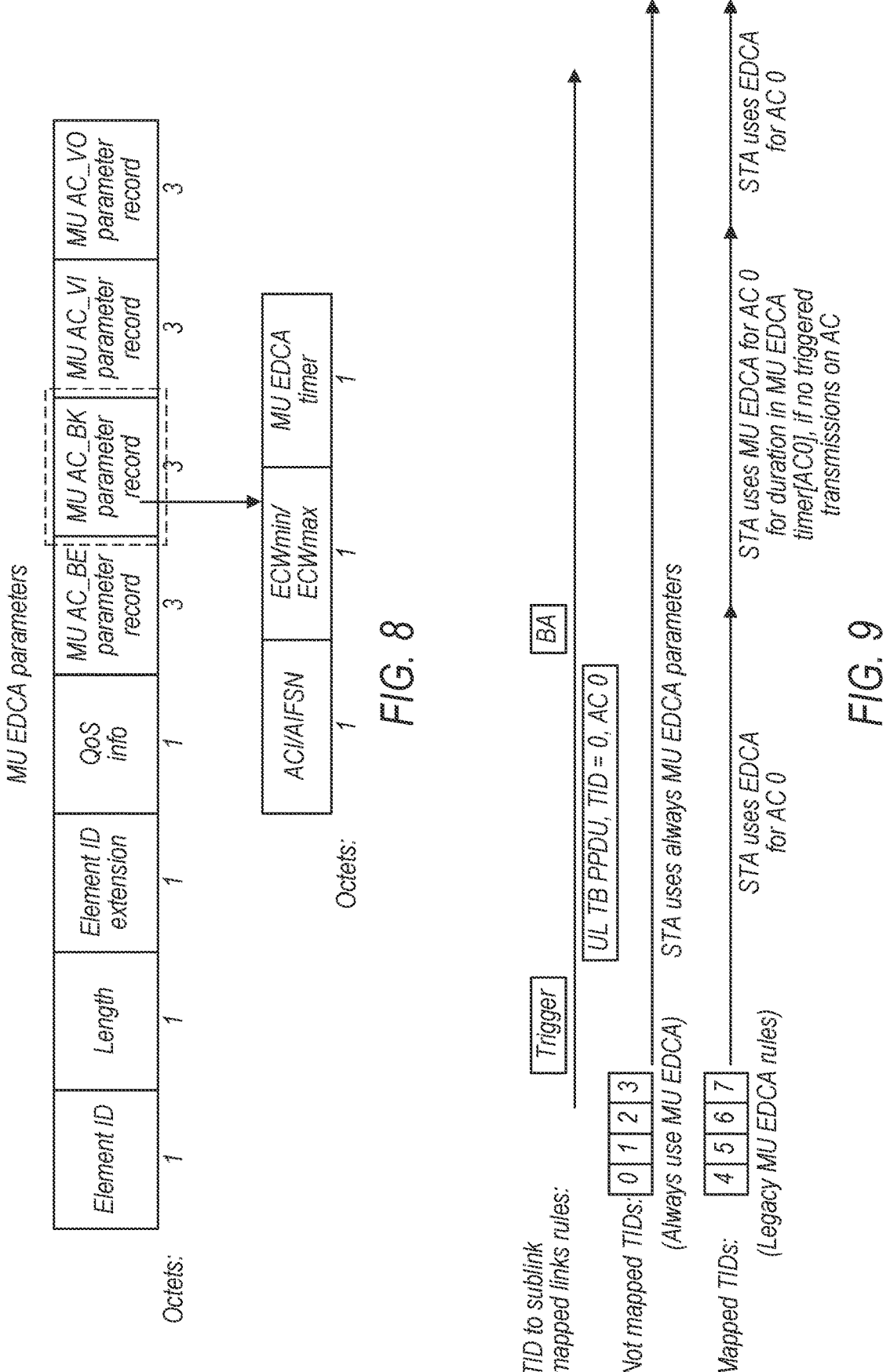
FIG. 8 illustrates example aspects of possible MU EDCA parameter signaling fields that could include EDCA parameter information, according to some embodiments.
FIG. 9 illustrates an example timeline according to which a MU EDCA timer can be used to trigger MU EDCA for an AC for a limited time before returning to EDCA parameters, according to some embodiments.

Not mapped TIDs may only use MU EDCA parameters: it may be the case that a STA cannot use an OMI parameter (UL MU Disable) to stop using the MU EDCA parameters for not mapped ACs. An MU EDCA parameter with AIFSN=0 may disable EDCA for an AC, e.g., such that a STA may not use the AC for EDCA transmissions. FIG. 8 illustrates example aspects of possible MU EDCA parameter signaling fields that could include EDCA parameter information, in particular illustrating the ACI/AIFSN, ECW$_{MIN}$/ECW$_{MAX}$, and MU EDCA timer portions of the MUAC_BK Parameter Record field.

In a scenario with TID subset to link mapping, an AP may trigger the corresponding STA for the link to transmit traffic from all TIDs; for example, this may prevent the need to activate other links when in power save, and/or may simplify operation when the link in question performs well. FIG. 9 illustrates an example timeline according to which a MU EDCA timer can be used to trigger MU EDCA for an AC for a limited time before returning to EDCA parameters. As shown, in the illustrated scenario, for not-mapped TIDs 0, 1, 2, and 3, an STA may be configured to always use MU EDCA parameters. For mapped TIDs 4, 5, 6, 7, the STA may be configured to use legacy MU EDCA rules. Based on a trigger frame from an AP, the STA may transmit an uplink transport block physical protocol data unit for TID=0, AC 0, and may receive a block acknowledgement from the AP. For a following duration indicated in MU EDCA timer [AC0], the STA may use MU EDCA for AC 0, if there are no triggered transmissions on the AC. As shown, after the duration is complete, the UE may return to using EDCA for AC 0.

Figure 10:
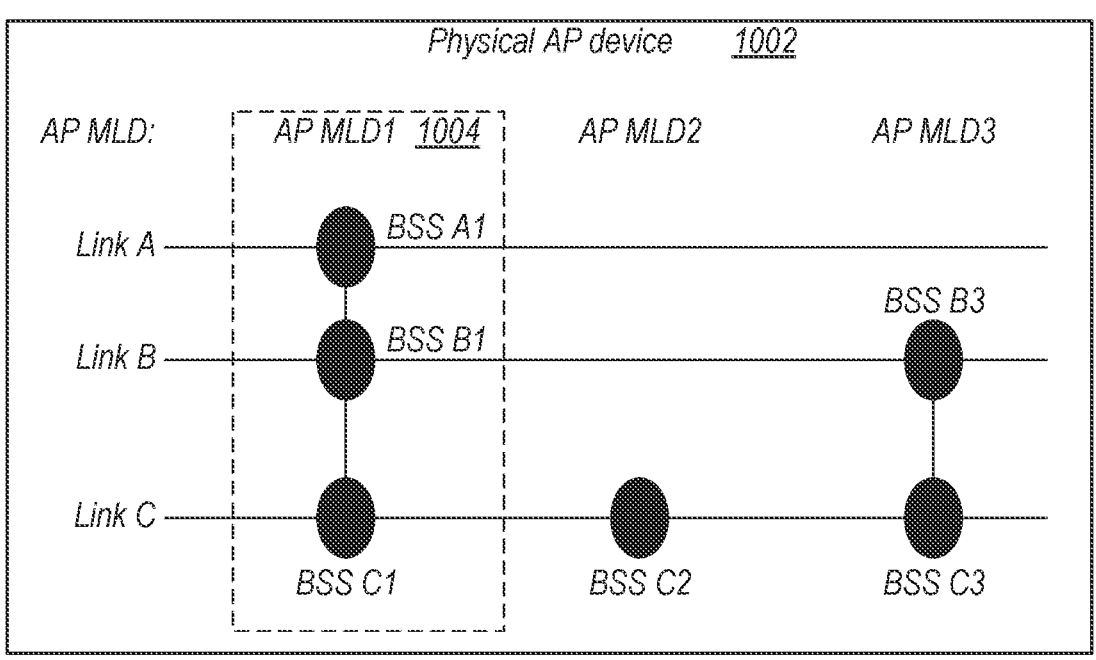
FIGS. 10-11 illustrate aspects of an example scenario in which a physical AP device operates multiple AP MLDs on multiple links, highlighting the deployment of multiple BSSs by a specific AP MLD of the physical AP device and the deployment of multiple BSSs by different AP MLDs of the physical AP device on the same link respectively, according to some embodiments.

According to some embodiments, an AP MLD may have associated STA MLDs that may operate in multiple links. For instance, FIG. 10 illustrates aspects of an example scenario in which an AP MLD1 of a physical AP device 1002 has three affiliated APs (links), in addition to having an AP MLD2 (e.g., with one link) and AP MLD3 (e.g., with two links). The different links may, for example, be deployed in different frequency ranges (e.g., 2.4 GHz, 5 GHz, 6 GHz). The current BSS load elements may not be capable of signaling the number of STA MLDs associated with an AP MLD, which may become increasingly significant as more devices operate as STA MLDs. Accordingly, it may be beneficial to provide a new MLD load element, e.g., as the current BSS load elements may not be capable of listing the number of associated STA MLDs for an AP MLD and the number of their links, or of signaling whether STA MLDs are allowed to freely use links, or whether the AP MLD applies congestion control to STA MLDs. The MLD load element may be designed to signal to an STA MLD whether the AP MLD is congested, and which affiliated AP (link) should be operated.

Figure 11:
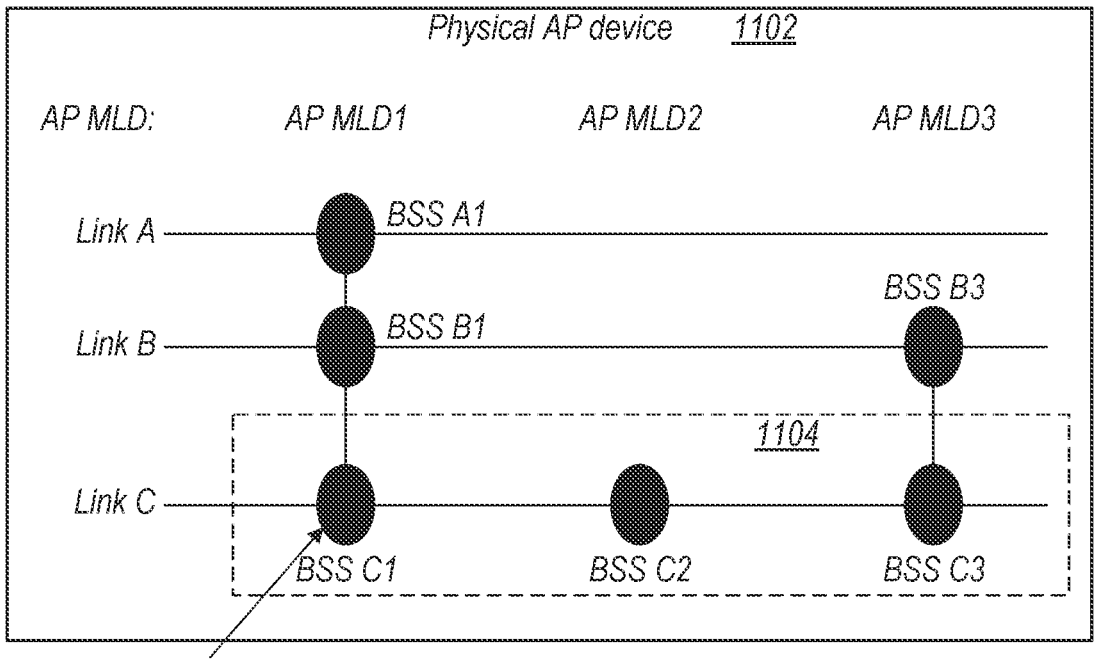

The current BSS load element designs report statistics per one BSS; for instance, in the illustrated scenario of FIG. 11, the BSS load element may contain the statistics only for a single BSS (e.g., BSS C1) while ignoring the other known BSSs (e.g., C2 and C3) provided by the same physical AP device 1102 that operate on the same link. A legacy STA that associates to this BSS may be interested in the impact on the BSS operation of those other BSSs operated by the same physical AP device on the same link. However, the statistics may not include traffic load on other BSSs that the same radio operates (e.g., BSS C2 and BSS C3 in the example scenario). STAs operating in C2 and C3 BSSs may consume the joint transmission resources (make the channel busy for the duration of their transmissions); the AP computational and operational load may increase as the number of STAs increase. Since currently BSS load element designs do not indicate the total number of STAs associated to BSSs operating in the same channel operated by the same AP, it may be beneficial, at least in some instances, for multiple BSSID and co-hosted beacons to always list link specific BSS load elements (e.g., not only including BSS specific users).

AP MLD congestion level may be more complicated to estimate than legacy BSS congestion level, at least in some instances. For example, the STA MLD capabilities to operate in links may have significant variation, and/or the STA MLD congestion may be divided unevenly between the links. As another possible consideration, the AP may perform congestion control/active load balancing to limit STA MLDs operation and balance service to legacy STA. Accordingly, there may be a variety of topics that can be considered to estimate AP MLD congestion level.

One possible topic that may characterize AP MLD congestion may include the associated legacy STAs and their capabilities. Associated STA MLD number, their capabilities, and setup links, may be another such possible topic. The number of associated legacy STAs and STA MLDs and their capabilities can characterize the likely use of bandwidth, number of spatial streams, EDCA, or triggered access. The associated STAs and STA MLDs setup links distributions may characterize affiliated APs congestion. The currently defined BSS load elements can list numbers of associated STA of the corresponding generations. An MLD load element may include the number of associated STA MLDs, capabilities, operated links, and congestion control use.

Another possible topic that may characterize AP MLD congestion may include STA MLD limitations. For example, as previously discussed herein, an AP MLD may limit the number of links in which the associated STA MLDs may operate to mitigate congestion and to share network resources more evenly. Correspondingly, the MLD load element may provide the number of limited STA MLDs and the number of disabled links, etc., that can effectively signal the presence of congestion control operations. A QoS Traffic element may signal the allowed TIDs in the link.

A further possible topic that may characterize AP MLD congestion may include link specific transmission resources availability. For example, the available transmission resources may signal the utilization of the link and likely QoS performance of the link. The currently defined BSS load elements may include comprehensive statistics on the air time utilization levels.

It may be beneficial to provide information on the associated STAs and STA MLDs to scanning devices (e.g., that are looking to associate with one or more BSSs). For example, a large number of associated STAs and STA MLDs may indicate a congested AP MLD, and/or may consume AP computing power such that longer operating delays could occur. In some embodiments, the number of associated STAs and STA MLDs may accordingly be listed, as well as the number of links and capabilities of the associated STA MLDs, and the number of created links and their distribution, in the MLD load element. For example, a "number of associated MHLDs" MLD load parameter may indicate the number of associated MLDs in the reporting level (RL), according to some embodiments. As another example, a "number of associated STAs" MLD load parameter may indicate the number of STAs associated with a BSS belonging to the RL. As a further example, a table of the number of setup links (1-15 links) of the associated STA MHLDs may be provided as a MLD load parameter. Such a table may indicate the number of MLDs that have the corresponding number of setup links that have associated with a BSS at the RL for each number of links from 1-15, as one possibility. As yet another example, a "number of associated NSTR MLDs" MLD load parameter may indicate the number of MLDs that have at least one NSTR link pair among the enabled links for the MLD. A further example MLD parameter "number of STR link pairs" may indicate the number of MLDs that have at least one STR link pair among the enabled links for the MHLD. A still further example MLD parameter "number of eMLSR MLDs" may indicate the number of associated MLDs that operate in eMLSR mode for at least one enabled link. A yet further example MLD parameter "number of eMLSR links" may indicate the number of enabled links operating in eMLSR mode at the RL. Note that although many examples of possible MLD load parameters are provided herein, the provided examples are not intended to be exhaustive, and it may be possible for different MLD load parameters to be used than the set of examples described herein, potentially including additional MLD parameters, fewer MLD parameters, and/or variations on or alternatives to the example MLD parameters described herein.

The legacy BSS load elements may include many STA count values. FIGS. 12-14 illustrate example details of possible formats for a BSS load element, an extended BSS load element, and a HE BSS load element, respectively. As shown, for the BSS load element illustrated in FIG. 12, the station count field may indicate the number of associated STAs (e.g., all associated STAs to the BSS), and the channel utilization and available admission capacity fields may provide air interface utilization information. For the extended BSS load element illustrated in FIG. 13, the MU-MIMO capable STA count field may indicate the number of associated STAs (e.g., STAs with MU Beamformee capable field=1 in VHT), and the spatial stream underutilization, observable secondary 20 MHz utilization, observable secondary 40 MHz utilization, and observable secondary 80 MHz utilization fields may provide air interface utilization information. For the HE BSS load element illustrated in FIG. 14, the HE STA count field may indicate the number of associated STAs (e.g., all associated 802.11ax capable STAs), and the utilization, frequency underutilization, and spatial stream underutilization fields may provide air interface utilization information. According to some embodiments, it may be the case that the air time utilization statistics may be common for all BSSs in the link. The associated STA numbers may currently list STAs associated to the BSS.

In some deployments, the ML Load element may be organized by using a Reconfiguration variant or Basic variant Multi-link element. For instance, these ML element types may carry link (Q/HT/HE) BSS load elements of APs in different links. The combined element may provide AP load information from multiple links in a frame transmitted in a single link. For instance, if a STA sends a Multi-link Probe Request frame to query AP MLD parameters, the AP may respond with Multi-Link Probe Response containing load information for each reported affiliated AP.

Figure 15:
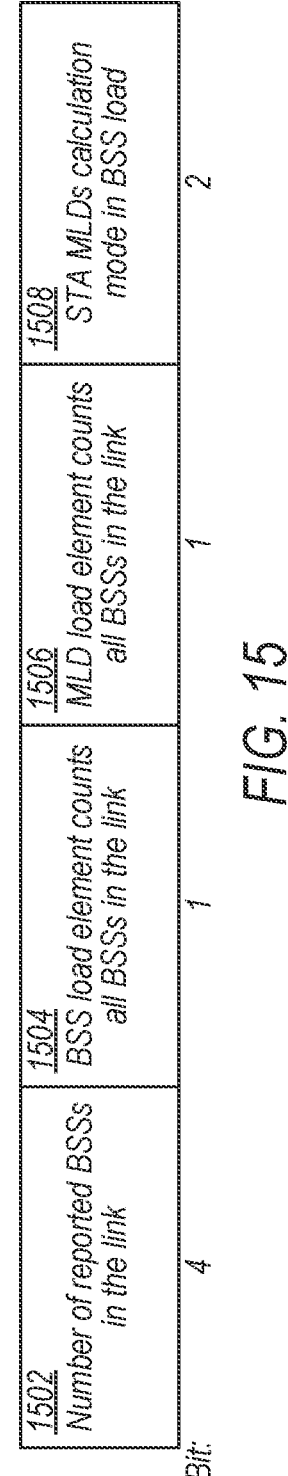
FIG. 15 illustrates aspects of an example signaling element for explaining how BSS load and MLD load statistics are calculated, according to some embodiments.
Figure 16:
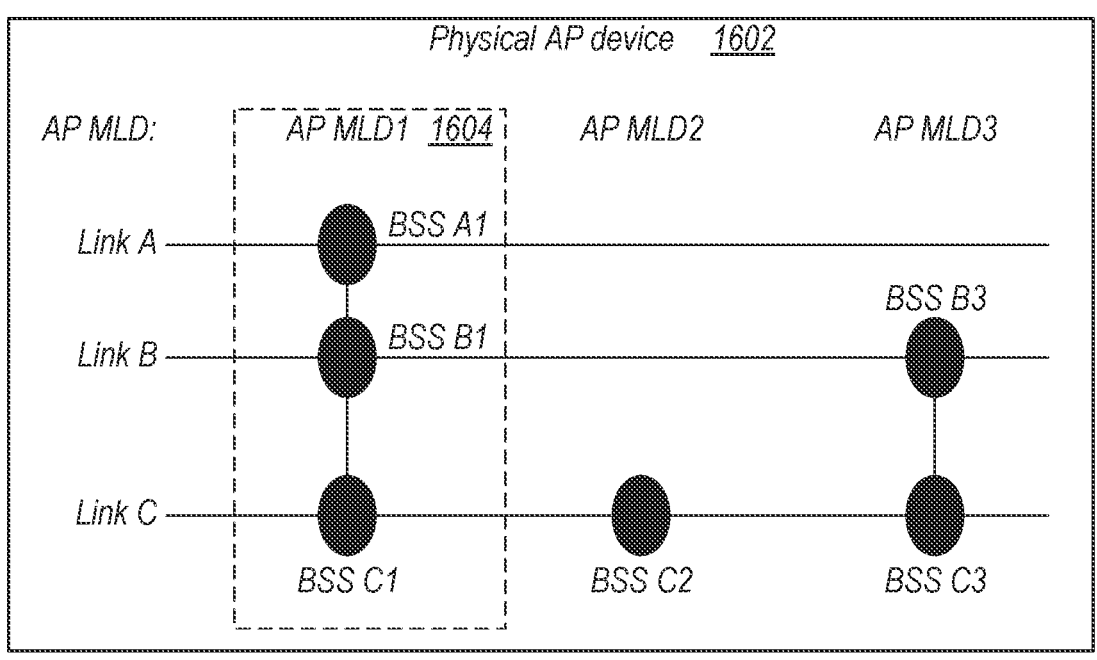
FIGS. 16-17 illustrate further aspects of the example scenario of FIGS. 10-11 in which a physical AP device operates multiple AP MLDs on multiple links, according to some embodiments.
Figure 17:
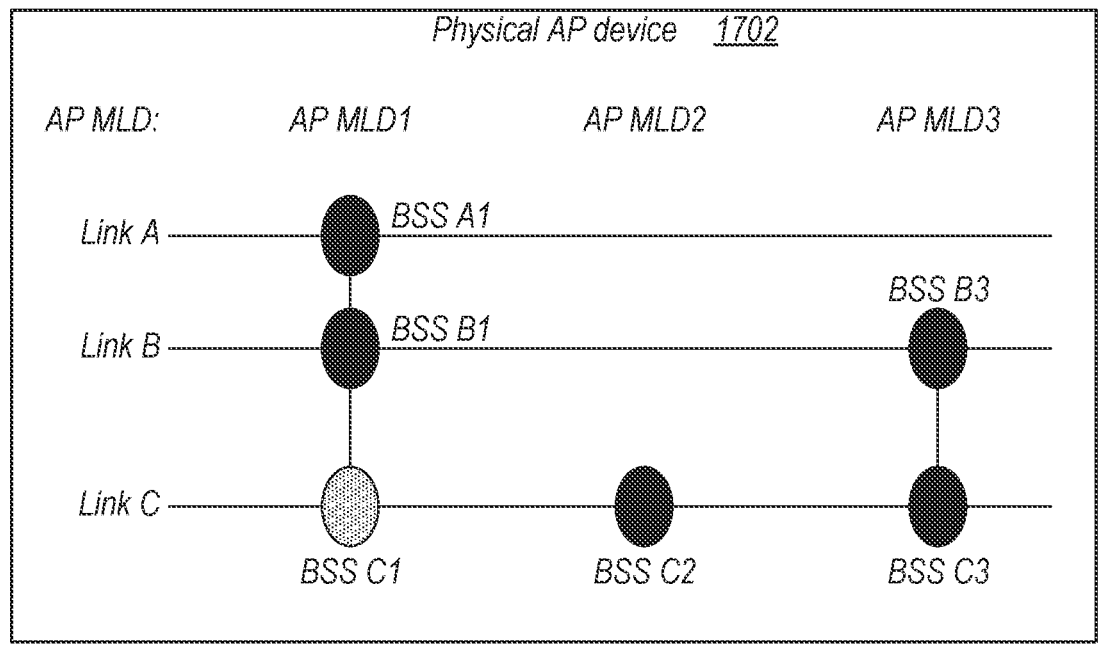

In some instances, the associated AP MLD impact may be included to the values, if it helps legacy STAs to estimate the traffic load more precisely. STA MLDs may get separate values for associated STA MLDs from the MLD load element. At least according to some embodiments, it may be useful for the MLD load element to include a signaling element that explains how the BSS load and MLD load statistics are calculated. For example, as previously discussed herein, one physical AP device may operate multiple BSSs in a link. The number of reported BSSs and all BSSs in the link reported may signal whether these are included to BSS load and MLD load parameters. The number of reported BSSs may help the receiver to know how many other BSSs the AP may have active. FIG. 15 illustrates aspects of an example signaling element for explaining how the BSS load and MLD load statistics are calculated. As shown, the signaling element could include a field 1502 for indicating the number of reported BSSs in the link, a field 1504 for indicating whether the BSS load element counts all BSSs in the link, a field 1506 for indicating whether the MLD load element counts all BSSs in the link, and/or a field 1508 for indicating the STA MLDs calculation mode in the BSS load element. According to some embodiments, the possible MLD calculation rules could include three rules (e.g., which could be signaled using a 2 bit field with one value reserved). According to a first rule, in the STA ID field (e.g., in the BSS load element), for 2.4 GHz, 5 GHz, and 6 GHz, +1 on every STA MLD with enabled link with the reported AP; in the MU-MIMO capable STA count field (e.g., in the extended BSS load element), there may be no change, and STA MLDs may not be counted in the field; and in the HE count field (e.g., in the HE BSS load element), for 2.4 GHz, 5 GHz, and 6 GHz, +1 on every STA MLD with enabled link with the reported AP. According to a second rule, in the STA ID field, in the MU-MIMO capable STA count field, and in the HE count field, there may be no change, and STA MLDs may not be counted in the field. According to a third rule, in the STA ID field, for 2.4 GHz, 5 GHz, and 6 GHz, +1 on every STA MLD with enabled link; in the MU-MIMO capable STA count field, there may be no change, and STA MLDs may not be counted in the field; and in the HE count field, for 2.4 GHz, 5 GHz, and 6 GHz, +1 on every STA MLD with enabled link.

As previously noted herein, an AP MLD may be able to limit the number of links that STA MLDs are allowed to operate, at least according to some embodiments. The MLD load may provide statistics regarding the number of links in which STA MLDs are not allowed to operate. The number of enabled setup links may also be listed, e.g., if the AP MLD allows relatively few setup links. It may be the case that the AP MLD signals all disabled links in the BSS regardless of whether those disabled links are due to a STA MLD voluntarily asking for link limitations or AP enforced STA MLD link disablement. According to some embodiments, MLD load parameters for associated MLD basic information for providing congestion control information can include any or all of the following example parameters. As one possibility, a MLD load parameter "number of associated MLDs with TID-to-sublink-mapping" may indicate the number of MLDs that have one or more links disabled. As another possibility, a MLD load parameter "number of disabled links" may indicate the number of disabled links. As a further possibility, a "number of associated STA MLDs with enhanced TID to link mapping" MLD load parameter may indicate the number of MLDs that have at least one link with only TIDs 4-7 mapped to it. As yet another possibility, a "number of enhanced TID to link mappings" MLD parameter may indicate the number of links with enhanced TID to link mapping. As a still further possibility, a "table of number of STA MHLDs operating on 1-15 links" may indicate the number of MLDs with the corresponding number of enabled links for each of 1 link, 2 links, . . . , 15 links, that are associated with a BSS.

A STA MLD may be able to generally estimate the AP MLD congestion level by using the number of associated STAs and STA MLDs and the number of limited links, according to some embodiments. In some embodiments, it may be the case that the congestion control information provided by an AP MLD does not change very fast. For example, it could be possible that changes to the TID to link mapping can take on the order of seconds to occur. Thus, at least in some instances, such signaling may provide a good indication of the AP MLD congestion level. Considering as an example the physical AP device 1602 illustrated in FIG. 16, for AP MLD1 1604 operating within the physical AP device 1602, for a low congestion level, the AP may not implement any limitations to the STA MLDs, which may be visible in the MLD load element as STA MLDs having setup multiple links, low numbers of associated STA MHLDs and STAs, and/or low air interface utilization. For a medium congestion level, one link may be dedicated for high QoS transmissions, and/or some STA MLDs operation may be limited, which may be visible in the MLD load element as some MLDs being indicated as operating in enhanced TID to link mapping. For a high congestion level, some STA MLDs may have multiple disabled links, and/or legacy STAs may be steered to specific links, which may be visible in the MLD load element as many STA MLDs having disabled links. For an overloaded congestion level, STA MLDs may generally be limited to operating only on a single link, and/or STAs may be steered to operate on different links to more evenly distribute load, which may be visible in the MLD load element as STA MLDs generally having setup only 1 or 2 links, and/or STA MLDs generally having multiple disabled links.

Different links may have different congestion levels. Accordingly, it may be useful to report air interface utilization statistics and signal how many legacy STAs and STA MLDs operate in the link for each of multiple links operated by an AP MLD, at least in some instances. It may be the case that the well-performing high-capacity links will have the highest traffic loads and may become congested first, e.g., since associated STAs may be able to achieve high throughput and low power consumption on these links. The multi-link operating mode (STR/NSTR/eMLSR) and triggered/EDCA channel access may signal the likely transmission operations in the link. At least some MLD parameters may be useful for performing link specific load estimation, as could for example be performed on a specific link such as the BSS C1 provided by AP MLD1 in the physical AP device 1702 illustrated in FIG. 17, according to some embodiments. Such parameters could include a "number of MLDs in the link" parameter to indicate the number of associated MLDs in the link. As another possible link-specific MLD load parameter, a "number of STAs in the link" parameter could indicate the number of STAs associated with a BSS. A "number of associated STA MLDs with enhanced TID to link mapping in the link" parameter could indicate the number of MLDs that have at least one link with only TIDs 4-7 mapped to it. A "number of NSTR link pairs" parameter could indicate the number of NSTR link pairs on enabled links. A "number of STR link pairs" parameter could indicate the number of STR link pairs on enabled links. A "number of eMLSR links" parameter could indicate the number of enabled links operating in eMLSR mode. A "number of EDCA only links" parameter could indicate the number of enabled links in which the MLD operates with EDCA. A "number of STAs in EDCA only access" parameter could indicate the number of legacy STAs that are capable only of sending uplink data with EDCA.

In some embodiments, an AP MLD may allocate one affiliated AP to only exchange high TID traffic (e.g., TIDs 4-7). Each link may report the TIDs that are allowed to be transmitted in the link by transmitting a QoS Traffic Capability element. A scanning STA MLD may accordingly be able to detect the allowed TIDs and estimate the link(s) they will setup and operate with the AP MLD. For example, if a STA MLD is transmitting best effort traffic, the STA may determine the APs that are not available to deliver its traffic. An AP that transmits only high TID traffic is likely to be a good selection for high priority traffic; such an AP may not have long TXOPs for transmitting best effort data. If a STA MLD transmits multiple TIDs, it may be the case that the STA MLD sets up multiple links. This may increase STA MLD power consumption. The STA MLD may select its STR/eMLSR multi-link operating mode based on the links TID mappings. Also, in some instances, the STA MLD may select the link in which it is available for trigger frames. FIG. 18 illustrates an example AP MLD architecture in which an AP MLD 1802 includes three affiliated APs: AP 1 1804, AP 2 1806, and AP 3 1808. FIG. 19 is a table illustrating an example of sets of link specific parameters that could be used in conjunction with the AP MLD architecture of FIG. 18, e.g., in which each AP can signal its own parameter values.

For STA MLD link specific traffic load estimation, the estimation may include link performance level estimation, for example including capabilities and potential to operate efficiently (e.g., BW, NSS, triggering, AP generation (e.g., Wi-Fi 4-7)). The estimation may also or alternatively include air time congestion level, for example including channel idle/busy information, bandwidth use statistics, the number of associated STAs and their capabilities (e.g., Wi-Fi 4-7). As a further possibility, the estimation may include congestion control signaling, for example including information regarding disabled links and the allowed TIDs. The STA MLD may estimate each link separately. The STA MLD may estimate operating efficiencies (potential throughputs and power consumption) on simultaneous operating alternatives (e.g., whether STA MLD uses STR or eMLSR on multiple links, what links it should activate for data TX/RX). As an example, FIG. 20 illustrates aspects of a system in which an AP MLD and a STA MLD have three links between them. FIG. 21 is a table illustrating possible performance assessments by the STA MLD for the three links based on the link specific load information for each of the links in the example scenario. Note that the illustrated results are merely an example of one possible set of performance assessments according to one possible set of performance assessment metrics, and that other individual results and combinations of results for other scenarios, and/or other performance assessment metrics, are also possible.

Figures 22, 23:
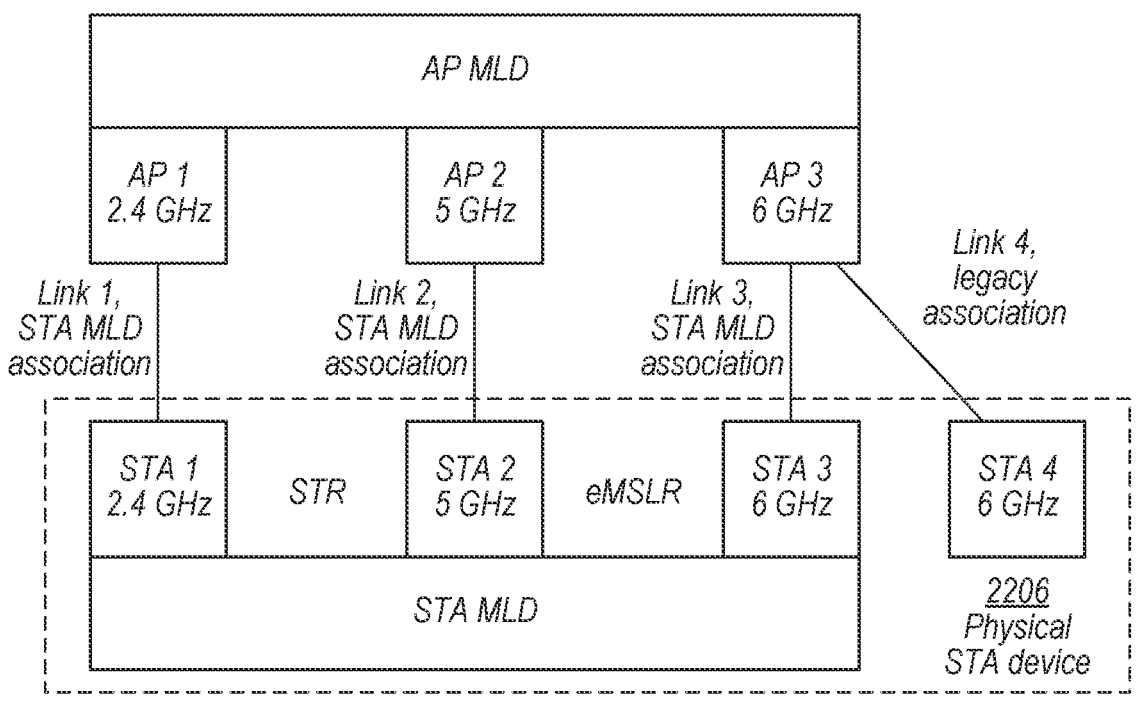
FIG. 22 illustrates aspects of an example system in which an AP MLD and a STA MLD have three links between them, and the physical STA device including the STA MLD can also operate a legacy STA, according to some embodiments.
FIG. 23 is a table illustrating an example of possible performance assessments by the physical STA device for the three APs of FIG. 22 based on the link specific load information and MLD level congestion level estimates for the links, according to some embodiments.

In some instances, the link specific congestion level estimation may be combined with MLD level congestion level estimation to select the link(s) for operation. The STA MLD may send association signaling in the best performing link, e.g., since the AP MLD cannot deny the link creation at the link in which the association request is transmitted. If one link has superior performance compared to other links, and if the AP MLD is heavily limiting operation in the links, the STA MLD may select to operate only as a single link legacy (e.g., Wi-Fi 6) STA and associate only to this link. If the association of the STA is successful, in such a scenario, it may be the case that the AP MLD cannot apply congestion control to the STA and force it to operate in other links. Disassociation of the STA may, however, still be possible. In some instances, the physical STA device may setup two associations in the best link. The STA MLD link may allow all Wi-Fi multi-radio transmissions, and the legacy STA may be used, if the AP MLD does not allow operation on a specific link for the STA MLD. The IP layer may perform traffic routing to the associations. As an example, FIG. 22 illustrates aspects of a system in which an AP MLD and a STA MLD have three links between them, and the physical STA device including the STA MLD can also operate a legacy STA. FIG. 23 is a table illustrating possible performance assessments by the physical STA device for the three APs based on the link specific load information and MLD level congestion level estimates for the links in the example scenario. Note that the illustrated results are merely an example of one possible set of performance assessments according to one possible set of performance assessment metrics, and that other individual results and combinations of results for other scenarios, and/or other performance assessment metrics, are also possible.

Figure 24:
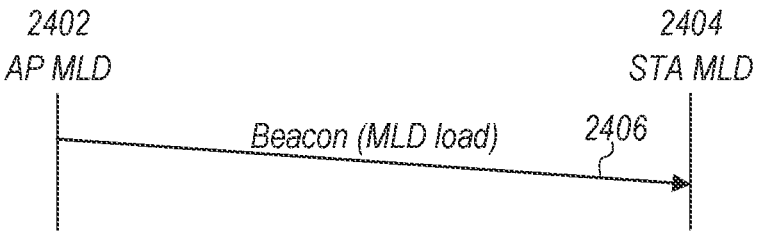
FIG. 24 illustrates aspects of an example scenario in which an AP MLD provides a beacon frame that includes MLD load information to a STA MLD, according to some embodiments.
Figure 25:
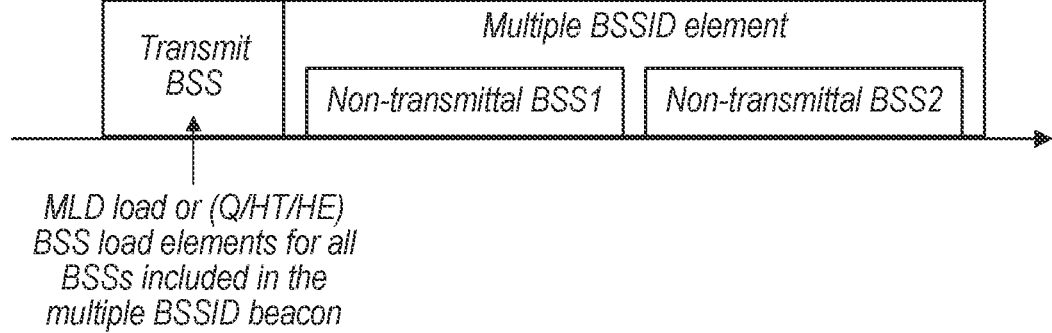
FIG. 25 illustrates example details of a possible MBSSID beacon frame that could include MLD load information, according to some embodiments.

According to some embodiments, it may be possible for a beacon frame provided by an AP MLD to contain (Q/HT/HE) BSS load element and link level MLD load element information. This may report the load level of the AP that transmits the beacon. Currently, each BSS in multiple BSSID element may transmit its own BSS load element. If the physical AP device operates a multiple BSSID beacon, then the BSS load and MLD load information may report statistics for all BSSs operating in the link. Similarly, the co-hosted beacons may contain information concerning all BSSs in the link. A bit in the MLD load element may signal that all BSSs in the link are reported in BSS load elements, at least in some instances. The MLD load may be mandatory to report in beacon frames, if the AP operates TID to sublink mapping congestion control, in some instances. This may signal that the AP is congested and that STA MLDs may be able to find a better candidate AP MLD. The transmit BSS in the multiple-BSSID (MBSSID) beacon or in co-hosted BSS may contain the MLD load or (Q/HT/HE) BSS load element. The number of associated STAs and capable STAs may be the sum of associated STAs of all APs the physical AP device operates in the link, in some instances. FIG. 24 illustrates aspects of an example scenario in which an AP MLD 2402 provides a beacon frame 2406 that includes MLD load information to a STA MLD 2404. FIG. 25 illustrates example details of such a possible MBSSID beacon frame. As shown, in the illustrated scenario, MLD load and/or (Q/HT/HE) BSS load elements for all affiliated BSSs may be included in the multiple BSSID beacon.

Figures 26, 27:
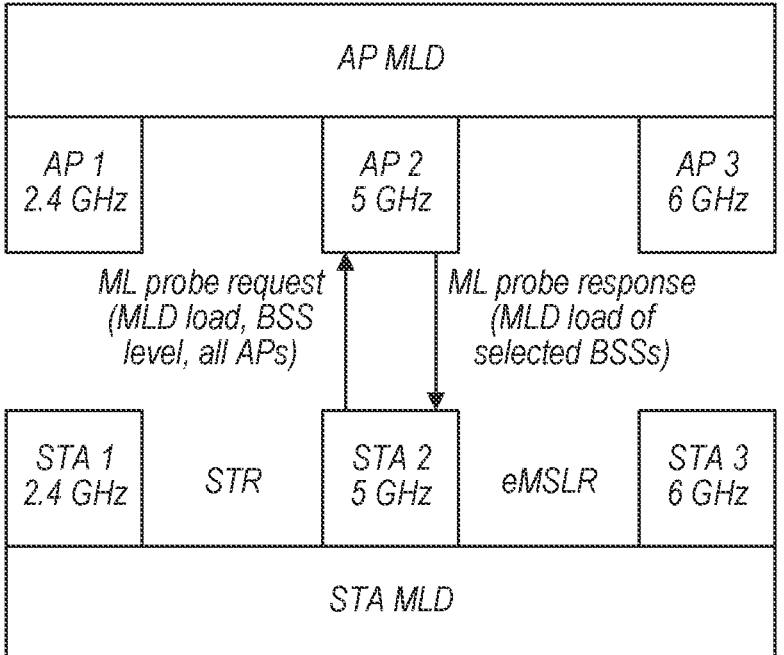
FIG. 26 illustrates aspects of an example system in which an AP MLD and a STA MLD have three links between them, and the STA MLD can provide a ML probe request and receive a ML probe response from the AP MLD, according to some embodiments.
FIG. 27 is a table illustrating possible numbers of 20 MHz channels in each of 2.4 GHz, 5 GHz, and 6 GHz bands, according to some embodiments.

MLD load information may be useful in scanning and AP MLD selection. FIG. 26 illustrates aspects of a system in which an AP MLD and a STA MLD have three links between them, and the STA MLD can provide a ML probe request and receive a ML probe response from the AP MLD. In some embodiments, a STA MLD may start scanning for APs on 2.4 GHz, e.g., as the 2.4 GHz band may have the smallest number of links to be scanned. For example, in some instances, the number of 20 MHz channels in each of 2.4 GHz, 5 GHz, and 6 GHz bands may be illustrated in the table of FIG. 27. The STA may receive reduced neighbor report information listing other APs in high bands based on the scanning in the 2.4 GHz band, at least in some instances. The STA MLD may transmit a ML probe request frame to an AP to query the performance of other affiliated APs. The ML probe request may specify the parameters the STA would like to receive, the links for which the STA MLD is requesting information, and/or the requested reporting level, according to various embodiments. The AP MLD may respond with a ML probe response. MLD load and (Q/HT/HE) BSS load elements may be transmitted separately for each link. MLD load may also be transmitted on the MLD level. Alternatively, the scanning STA may define the level of response (e.g., based on the parameters of the ML probe request). The scanning STA may be able to use the information to estimate whether it wants to associate with the AP MLD. Note that associated STAs may also use such a ML probe request to look for a good performing link. Also note that the scanning STA MLD may not need to scan each AP separately, at least in some instances.

Figure 28:
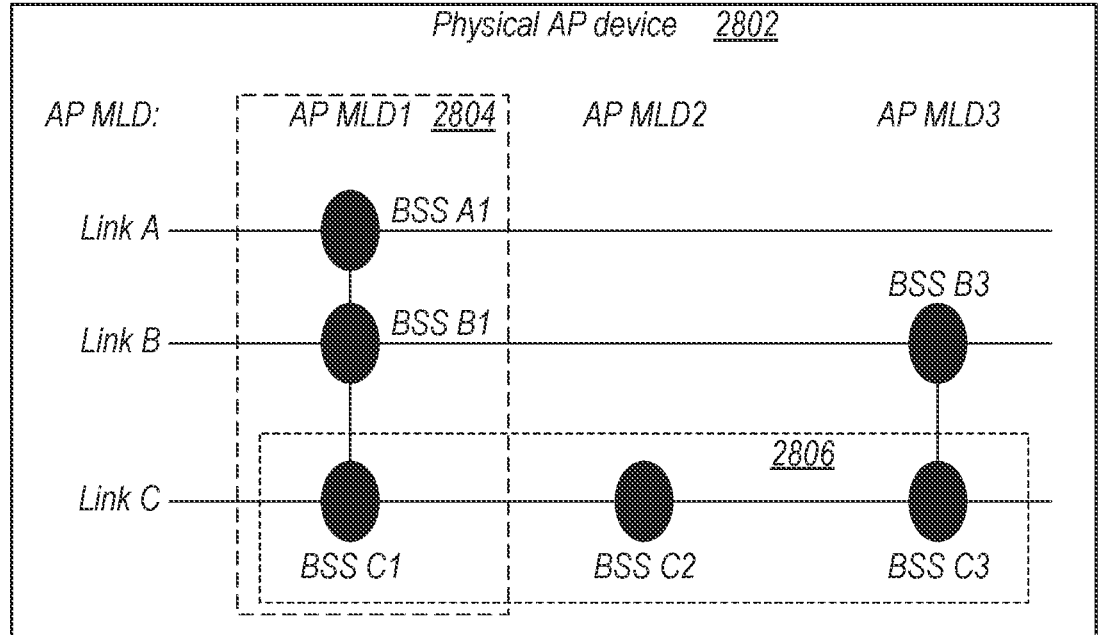
FIG. 28 illustrates further aspects of the example scenario of FIGS. 10-11 and 16-17 in which a physical AP device operates multiple AP MLDs on multiple links, according to some embodiments.

As described herein, there may be more possible reporting levels for MLD load reporting in comparison to legacy BSS load reporting. For example, as illustrated in FIG. 28, for a system with three AP MLDs operating on three links, it may be possible to perform load reporting on a BSS level (e.g., including only BSS specific information, such as for only BSS B1 illustrated in FIG. 28), on a link level (e.g., including a combined report of all BSSs the physical AP device operates in the link, such as for the set of BSSs 2806 on link C illustrated in FIG. 28), on an AP MLD level (e.g., including a combined report of all affiliated APs in the AP MLD, such as for the AP MLD 1 2804 illustrated in FIG. 28), and/or on a physical AP device level (e.g., including a combined report of all BSSs and MLDs operated in the physical AP device, such as the physical AP device 2802 illustrated in FIG. 28). It may be the case that the beacon reports the MLD load for the link in which the beacon is transmitted and optionally the MLD level congestion (sum of all associated STAs and AP MLDs and their links). A ML probe request may signal the reporting level at which MLD load parameters are requested.

The ML probe response may provide reporting at the requested level. Depending on the available report size, the reporting may thus be done per BSS, link, AP MLD, and/or physical AP device. All BSSs, links, or AP MLDs may be reported separately. The reporting may have conditions (e.g., report all links that are operated by the AP MLD, as one possibility). As one example, reporting at the BSS level may include BSS specific information. As another example, reporting at the link level may include the link specific information regarding BSSs and AP MLDs that operate on the link. As yet another example, reporting at the AP MLD level may include the AP MLD specific information, including specific information on links and BSSs that the AP MLD operates. As a still further example, reporting at the physical AP device level may include physical AP information, including specific information for all AP MLDs, links, and BSSs operated by the physical AP device.

Network load balancing among available APs, e.g., with the target of ensuring that no AP is over-congested, for example by attempting to load the APs evenly, may be performed for non-multi-link network operation. AP MLD congestion control mechanisms (e.g., for Wi-Fi 7, as one possibility) could be introduced to attempt to balance non-AP MLDs to operate evenly with the APs in a communication system. This may be useful, among other reasons, as UL EDCA transmissions may consume transmission resources and cause contention. However, providing congestion control mechanisms may also potentially prevent some multi-link operations; for example, while in a well-managed network, load balancing may work well, in a poorly managed network load balancing using congestion control mechanisms could be harmful to QoS and throughput for STA MLDs. Supporting the ability of STA MLDs to operate within multiple different network types may be important, at least in some instances. Accordingly, it may be useful to provide tools to verify that AP congestion control is necessary, e.g., in order to allow congestion control in appropriate scenarios while limiting their potential for harmful use by poorly managed networks. For example, configurations may be supported in which congestion control is only allowed in scenarios with high traffic load and/or high number of associated STAs.

As previously discussed herein, it may be possible for an AP MLD to disable one or more links or have a semi-mapped link (e.g., that is used to transmit only high TIDs). It may be the case that one or more rules are used to avoid the use of such congestion control unless it is the last option to ensure AP MLD operation remains effective. In some embodiments, this could include requiring that the AP MLD load level is higher than a certain threshold to implement congestion control operations. Further, it may be possible that different congestion control operations have different load thresholds. Such load level thresholds could be defined and signaled using the MLD load element. For example, the AP MLD may indicate that it is allowed to use congestion control if the load is above an indicated threshold. TID advertisement may be used to signal AP power save/temporary unavailability, in some embodiments.

FIG. 29 is a signal flow diagram illustrating example aspects of a scenario in which an AP MLD performs TID-to-link mapping for a STA MLD, according to some embodiments. As shown, in the illustrated scenario, the AP MLD 2902 may provide a beacon (2906) (including MLD load information) to the STA MLD 2904. The AP MLD 2902 may also provide a TID-to-link mapping request (2908) to the STA MLD 2904. The STA MLD 2904 may provide a TID-to-link mapping counter proposal (2910) to the AP MLD 2902. The AP MLD 2902 may respond with a follow-up TID-to-link mapping request (2912), which may (or possibly may not, depending on load level) be revised in view of the TID-to-link mapping counter proposal. Provided the TID-to-link mapping adheres to the configured rules for TID-to-link mapping indicated in the MLD load information (e.g., in view of the current load level for the AP MLD 2902), the STA MLD 2904 may adhere to the configured TID-to-link mapping.

FIG. 30 is a table illustrating examples of possible BSS load threshold levels at which an AP MLD may be allowed to perform the corresponding congestion control signaling, according to one set of embodiments. As shown, in the illustrated example, at load level 1 (at any load level, i.e., not limited), an AP MLD may request voluntary TID-to-sublink mapping. At load level threshold 2, the AP MLD may provide a prioritized request for semi-mapped link. At load level threshold 3, the AP MLD may provide a prioritized TID-to-sublink request. At load level threshold 4, the AP MLD may perform TID-to-link mapping according to a STA MLD counter proposal. At load level threshold 5, the AP MLD may perform TID-to-link mapping even against a STA MLD counter proposal. Note that other load threshold frameworks are also possible.

It may also be possible that each link has a separate load level threshold that may be required to be met in order to disable the link for a STA MLD by an AP MLD. The threshold for a given link may be related to the link capacity, in some instances; for example, it may be the case that the links with the highest capacity have the highest thresholds. As an example, FIG. 31 is a table illustrating various load level thresholds that could be defined for limiting TIDs/disabling links for links in various frequency bands and frequency band combinations, according to some embodiments.

In some embodiments, links may have multi-link operation modes (NSTR/STR/eMLSR) load level thresholds. Also, STAs that may use only EDCA may have a different load threshold. As an example, FIG. 32 is a table illustrating various load level thresholds that could be defined for disabling links for different multi-link modes, according to some embodiments.

At least according to some embodiments, an AP may check after every time it uses congestion control for a STA MLD whether the link level is still above the threshold. For example, it may be beneficial to avoid allowing the possibility of exhaustive link disablements if load briefly and/or barely increases above a load threshold. Thus, it may be the case that after each congestion control use, the AP should check again whether the traffic load is above the threshold for that congestion control use. It may also be possible that multiple load level thresholds can be used at the same time (and that they may all need to be met) in order for a given congestion control mechanism to be used, according to some embodiments.

FIG. 33 is a table illustrating one specific example set of requirements for allowing an AP MLD to be allowed to disable a link from a STA MLD, which could be configured for an enterprise class network, according to one set of embodiments. If conditions indicated in the illustrated table are not met, in this example scenario, it may be the case that the link may not be disabled for any STA MLD. The associated STA MLDs for the AP MLD may be able to confirm from the MLD load element and/or by listening on the link that these values are met when the AP MLD does implement congestion control. If the values are not met, it may be the case that they do not need to follow the AP's TID-to-link mapping signaling; in some instances, it may be possible that such a STA MLD could use a reason code "LOAD_THRESHOLD_NOT_MET" to reject such AP requests.

Figures 34, 35:
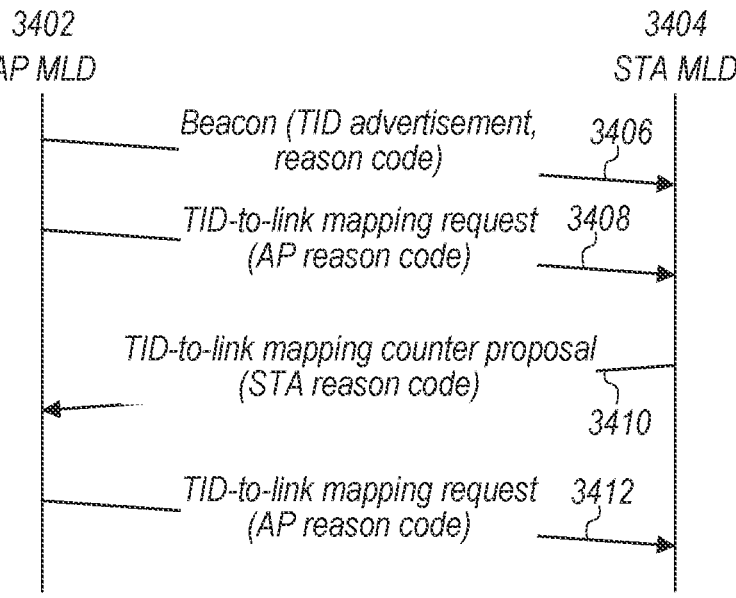

In some cases, the AP MLD may not desire to send its MLD load, or may optionally send it sometimes. Such an AP MLD may use reason codes in the signaling to justify a request for TID-to-link mapping (e.g., link disablement or partial TID-to-link mapping). The STA MLD may also be able to use reason codes in a counter-proposal, for example to explain why it cannot accept the proposed mapping, to object to the mapping, because the AP is not congested, or to accept the mapping, among various possibilities. FIG. 34 is a signal flow diagram in which an AP MLD 3402 and a STA MLD 3404 can negotiate TID-to-link mapping using reason codes. As shown, in the illustrated scenario, the AP MLD 3402 may provide a beacon (3406) (including TID advertisement, reason code) to the STA MLD 3404. The AP MLD 3402 may also provide a TID-to-link mapping request (3408), which may include an AP reason code, to the STA MLD 3404. The STA MLD 3404 may provide a TID-to-link mapping counter proposal (3410), which may include a STA reason code, to the AP MLD 3402. The AP MLD 3402 may respond with a follow-up TID-to-link mapping request (3412), which may also include an AP reason code. Provided the TID-to-link mapping adheres to the configured rules for TID-to-link mapping indicated in the MLD load information (e.g., in view of the current load level for the AP MLD 3402), the STA MLD 3404 may adhere to the configured TID-to-link mapping. FIG. 35 is a table illustrating a variety of example AP reason code values and meanings that could be defined for use in such a system, according to some embodiments. Similarly, FIG. 36 is a table illustrating a variety of example STA reason code values and meanings that could be defined for use in such a system, according to some embodiments.

Thus, using the techniques described herein, it may be possible to provide a new MLD load element, which may be capable of signaling AP MLD load, use of congestion control, numbers of associated STAs and their parameters, and/or a variety of other possible information. The reporting may be provided in link-level and/or MLD level. STA MLDs may be capable of using the MLD load element to select the AP MLD to which the STA MLD associates, to select the link in which the STA operates, and/or to ensure that AP MLD has high enough load level to justify load balancing performed by the AP MLD, among various other possible uses that can facilitate effective and efficient network operation for multi-link devices as well as non-multi-link devices, at least according to some embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., an AP 104 or a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
an antenna;
a radio operably coupled to the antenna; and
a processor operably coupled to the radio;
wherein the wireless device is configured to:
operate as a multi-link device (MLD) access point (AP) to provide a plurality of basic service sets (BSSs); and
provide MLD load information associated with at least a first BSS of the plurality of BSSs provided by the MLD AP, wherein the MLD load information includes at least an indication of a number of multi-link capable wireless devices associated with the first BSS of the plurality of BSSs provided by the MLD AP, wherein wireless devices that are not MLDs are not counted in the number of multi-link capable wireless devices associated with the first BSS of the plurality of BSSs provided by the MLD AP.

2. The wireless device of claim 1, wherein the MLD load information further includes an indication of one or more of:
a number of non-multi-link capable wireless devices associated with the first BSS of the plurality of BSSs provided by the MLD AP;
multi-link capability information for one or more wireless devices associated with the first BSS of the plurality of BSSs provided by the MLD AP;
a number of wireless links setup for wireless devices associated with the first BSS of the plurality of BSSs provided by the MLD AP;
a number of wireless links disabled for the first BSS of the plurality of BSSs provided by the MLD AP;

a number of wireless devices with at least one link disabled for the first BSS of the plurality of BSSs provided by the MLD AP; or a number of wireless links with limitations on mapped traffic identifiers for the first BSS of the plurality of BSSs provided by the MLD AP.

3. The wireless device of claim 1, wherein the MLD load information is associated with only the first BSS.

4. The wireless device of claim 1, wherein the MLD load information is associated with all BSSs provided by the wireless device in a specific frequency range.

5. The wireless device of claim 1, wherein the MLD load information is associated with all BSSs provided by the MLD AP.

6. The wireless device of claim 1, wherein the wireless device is further configured to operate one or more additional MLD APs, wherein the MLD load information is associated with all BSSs provided by all MLD APs operated by the wireless device.

7. The wireless device of claim 1, wherein the wireless device is further configured to:

provide a request to enable a first congestion control mechanism to a MLD station (STA) associated with a second BSS provided by the wireless device, wherein the request comprises reason code information indicating a justification for enabling the first congestion control mechanism; and receive a counter proposal from the MLD STA, wherein the counter proposal comprises second reason code information indicating a second justification for the counter proposal.

8. The wireless device of claim 7, wherein the wireless device is further configured to:

provide an indication of a congestion control mechanism enablement configuration for the second BSS provided by the wireless device, wherein the congestion control mechanism enablement configuration defines which congestion control mechanisms are allowed at which load level thresholds in the second BSS provided by the wireless device; and determine that a load level in the BSS meets a load level threshold at which the first congestion control mechanism is allowed in the second BSS provided by the wireless device, wherein the request to enable the first congestion control mechanism is provided to the MLD STA based at least in part on determining that the load level in the second BSS meets the load level threshold at which the first congestion control mechanism is allowed in the second BSS provided by the wireless device.

9. The wireless device of claim 7, wherein the reason code information indicating justification for enabling the first congestion control mechanism provides an indication of one or more of:

lack of air interface resources available in the second BSS;

too many associated STAs in the second BSS;

too many associated MLD STAs in the second BSS;

too many links in the MLD AP providing the second BSS;

a load-balancing-based reason for enabling the first congestion control mechanism;

a link associated with the second BSS being reserved for traffic with high traffic identifiers (TIDs);

all APs operated by the wireless device being congested; or a MLD AP power consumption-based reason for enabling the first congestion control mechanism.

10. The wireless device of claim 1, wherein the MLD load information associated with the first BSS of the plurality of BSSs provided by the MLD AP is provided to one or more station (STA) wireless devices in one or more of:

a beacon broadcast transmission by the wireless device; or a probe response unicast transmission by the wireless device, wherein the probe response unicast transmission is provided in response to a probe request received by the wireless device.

11. A method, comprising:

by a wireless device:

receiving multi-link device (MLD) load information from an MLD access point (AP), wherein the MLD load information is associated with at least a first basic service sets (BSS) of a plurality of BSSs provided by the MLD AP, wherein the MLD load information includes at least an indication of a number of multi-link capable wireless devices associated with the first BSS of the plurality of BSSs provided by the MLD AP, wherein wireless devices that are not MLDs are not counted in the number of multi-link capable wireless devices associated with the first BSS of the plurality of BSSs provided by the MLD AP.

12. The method of claim 11, wherein the MLD load information further includes an indication of one or more of:

a number of non-multi-link capable wireless devices associated with the first BSS of the plurality of BSSs provided by the MLD AP;

multi-link capability information for one or more wireless devices associated with the first BSS of the plurality of BSSs provided by the MLD AP;

a number of wireless links setup for wireless devices associated with the first BSS of the plurality of BSSs provided by the MLD AP;

a number of wireless links disabled for the first BSS of the plurality of BSSs provided by the MLD AP;

a number of wireless devices with at least one link disabled for the first BSS of the plurality of BSSs provided by the MLD AP; or a number of wireless links with limitations on mapped traffic identifiers for the first BSS of the plurality of BSSs provided by the MLD AP.

13. The method of claim 11, wherein the method further comprises:

receiving a request to enable a congestion control mechanism from the MLD AP, wherein the request includes reason code information indicating a justification for enabling the congestion control mechanism; and providing a counter proposal to the MLD AP in response to the request, wherein the counter proposal includes reason code information indicating a second justification for the counter proposal.

14. The method of claim 13, wherein the reason code information indicating the second justification for the counter proposal comprises an indication of one or more of:

an internal interference or co-existence-based reason for the counter proposal;

a wireless device power consumption-based reason for the counter proposal;

a Quality of Service (QOS)-based reason for the counter proposal; or a congestion-based reason for the counter proposal, wherein the wireless device has observed insufficient congestion to support the requested congestion control mechanism.

15. The method of claim 11, wherein the method further comprises:

receiving an indication of one or more reporting levels for the MLD load information, wherein one or more reporting levels includes one or more of:

MLD load information for a single BSS provided by the MLD AP;

MLD load information for all BSSs provided by the MLD AP in a specific frequency range;

MLD load information for all BSSs provided by a single MLD AP operated by the MLD AP; or MLD load information for all BSSs provided by all MLD APs operated by the MLD AP.

16. An apparatus, comprising:

a processor configured to, when executing instructions stored in a memory, perform operations comprising:

receive multi-link device (MLD) load information from an MLD access point (AP), wherein the MLD load information is associated with at least a first basic service sets (BSS) of a plurality of BSSs provided by the MLD AP, wherein the MLD load information includes at least an indication of a number of multi-link capable wireless devices associated with the first BSS of the plurality of BSSs provided by the MLD AP, wherein wireless devices that are not MLDs are not counted in the number of multi-link capable wireless devices associated with the first BSS of the plurality of BSSs provided by the MLD AP.

17. The apparatus of claim 16, wherein the MLD load information is received in a beacon transmission from the MLD AP, wherein the beacon transmission comprises a multiple BSS identifier (MBSSID) beacon that includes load information for a BSS associated with the beacon transmission and for one or more other BSSs provided by the AP device.

18. The apparatus of claim 16, the operations further comprising:

provide a probe request to the MLD AP; and receive a probe response from the MLD AP, wherein the probe response includes the MLD load information.

19. The apparatus of claim 18, wherein the probe request indicates a requested reporting level for the MLD load information, wherein the reporting level is selected from one of BSS level reporting, link level reporting, AP MLD level reporting, or physical AP device level reporting.

20. The apparatus of claim 16, the operations further comprising:

select a BSS with which to associate based at least in part on the MLD load information; and establish an association with the selected BSS.

\* \* \* \* \*